United States Patent
Smith et al.

(10) Patent No.: US 11,053,142 B2
(45) Date of Patent: Jul. 6, 2021

(54) DESALINATON DEVICES

(71) Applicant: THE BOARD OF TRUSTEES OF THE UNIVERSITY OF ILLINOIS, Urbana, IL (US)

(72) Inventors: Kyle C. Smith, Champaign, IL (US); Rylan Doyle Dmello, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 633 days.

(21) Appl. No.: 15/821,385

(22) Filed: Nov. 22, 2017

(65) Prior Publication Data

US 2018/0148355 A1    May 31, 2018

Related U.S. Application Data

(60) Provisional application No. 62/427,502, filed on Nov. 29, 2016.

(51) Int. Cl.
  *C02F 1/469*   (2006.01)
  *B01D 61/46*   (2006.01)
  (Continued)

(52) U.S. Cl.
  CPC .......... *C02F 1/4693* (2013.01); *B01D 61/422* (2013.01); *B01D 61/46* (2013.01);
  (Continued)

(58) Field of Classification Search
  CPC .... C02F 1/4691; C02F 1/4693; C02F 1/4695; C02F 2001/46161; C02F 2103/08;
  (Continued)

(56) References Cited

U.S. PATENT DOCUMENTS

2017/0334750 A1*  11/2017  Nitta .................... C02F 1/46109

OTHER PUBLICATIONS

S. Porada et al. "Nickel Hexacyanoferrate Electrodes for Continuous Cation Intercalation Desalination of Brackish Water" Electrochimica Acta. 255 pp. 369-378 (2017) (Year: 2017).*

(Continued)

*Primary Examiner* — Xiuyu Tai
(74) *Attorney, Agent, or Firm* — Guntin & Gust, PLC; Matthew Tropper

(57) ABSTRACT

The exemplary embodiments provides a desalination device comprising an electrochemical cell comprising a porous positive electrode, a porous negative electrode, and a membrane positioned between the porous positive electrode and the porous negative electrode, the electrodes comprising a network of conductive material comprising a plurality of electrode active materials dispersed throughout the conductive material, the porous negative electrode and the porous positive electrode have the same electrode active material, a power supply to supply a current to the electrochemical cell, an inlet for providing a feed stream to the electrochemical cell, a first outlet line for removing a concentrated effluent and a second outlet line for removing a desalinated effluent. Also provided is a desalination device having a plurality of electrochemical channels with alternating anion and cation selective membranes, and a porous negative and positive electrode having the same electrode active material.

20 Claims, 32 Drawing Sheets
(32 of 32 Drawing Sheet(s) Filed in Color)

(51) Int. Cl.
  *B01D 61/42* (2006.01)
  *C02F 103/08* (2006.01)
  *C02F 1/461* (2006.01)
(52) U.S. Cl.
  CPC .......... *C02F 2001/46161* (2013.01); *C02F 2103/08* (2013.01); *Y02A 20/124* (2018.01)
(58) Field of Classification Search
  CPC .... C02F 2001/46133; C02F 2201/4613; C02F 1/4602; C02F 1/4604; C02F 1/4672; C02F 1/46109; C02F 1/46104; C02F 2303/22; C02F 2201/46115; C02F 2201/4618; C02F 2303/04; C02F 1/46114; C02F 2001/46138; C02F 2001/46171; C02F 2201/46; B01D 61/42; B01D 61/422; B01D 61/46; B01D 69/02; B01D 69/10; B01D 2325/42; B01D 2323/26; B01D 2313/345; Y02A 20/124; C25B 9/73; C25B 9/77; C25B 1/13
  See application file for complete search history.

(56) References Cited

OTHER PUBLICATIONS

Sun, Bin et al., "Separation of low concentration of cesium ion from wastewater by electrochemically switched ion exchange method: Experimental adsorption kinetics analysis", Journal of Hazardous Materials 233-234 (2012) 177-183.
Albertus, P. et al., Dualfoil 5 Program and Documentation http://www.cchem.berkeley.edu/jsngrp/fortran.html (2015), 1 page.
Almarzooqi F., Desalination, 342, 3-15 (2014).
Alvarado, L. et al., Electrochimica Acta, 132, 583-597 (2014).
Bazant, M.Z., Acc. Chem. Res., 46, 1144-1160 (2013).
Biesheuvel, P.M. et al., J. Membr. Sci., 346, 256-262 (2010).
Biesheuvel P.M., J. Colloid Interface Sci., 332, 258-264 (2009).
Blair, J.W. et al., Saline Water Conversion, Advances in Chemistry., vol. 27, p. 206-223, American Chemical Society (1960) http://dx.doi.org/10.1021/ba-1960-0027.ch020.
Brauns, E. et al., Sep. Purif. Technol., 98, 356-365 (2012).
Cao, Y. et al., Adv. Mater., 23, 3155-3160 (2011).
Chambers, J.F. et al., J. Phys. Chem., 60, 985-986 (1956).
Chevrier, V.L. et al., J. Electrochem. Soc., 158, A1011-A1014 (2011).
Della Monica, M. et al., Electrochimica Acta, 24, 1013-1017 (1979).
Delmas, C. et al., Mater. Res. Bull., 22, 631-639 (1987).
Dermentzis, K., Electrochimica Acta, 53, 2953-2962 (2008).
Dermentzis, K., Electrochimica Acta, 53, 7123-7130 (2008).
Doyle, M. et al., J. Electrochem. Soc., 140, 1526-1533 (1993).
Doyle, M. et al., J. Electrochem. Soc., 143, 1890-1903 (1996).
Elimelech, M. et al., Science, 333, 712-717 (2011).
Fuller, T.F. et al., J. Electrochem. Soc., 141, 1-10 (1994).
Ghaffour, N. et al., Desalination, 309, 197-207 (2013).
Gomes, W. J. A. S. et al., Langmuir, 31, 8710-8717 (2015).
Guler, H. et al., Mater. Chem. Phys., 99, 394-397 (2006).
Hamer, W.J. et al., J. Phys. Chem. Ref. Data, 1, 1047-1100 (1972).
Hartung, S. et al., ChemPhysChem, 15, 2121-2128 (2014).
Jeon, H. et al., Sci. Rep., 3 (2013) http://www.nature.com/srep/2013/131219/srep03483/full/srep03483.html.
Jeon, S. et al., Energy Environ. Sci., 6, 1471-1475 (2013).
Karyakin, A.A. , Electroanalysis, 13, 813-819 (2001).
Katz, W.E. , Desalination, 28, 31-40 (1979).
Kim, D.J. et al., J. Power Sources, 244, 758-763 (2013).
Kim, S. et al., Electrochimica Acta, 203, 265-271 (2016).
Kim, T. et al., Environ. Sci. Technol., 50, 9791-9797 (2016).
Knust, K.N. et al., Chem. Int. Ed., 52, 8107-8110 (2013).
Kodym, R. , J. Appl. Electrochem., 42, 645-666 (2012).
Lai, W. et al., Electrochimica Acta, 56, 4369-4377 (2011).
Lee, J. et al., Energy Env. Sci, 7, 3683-3689 (2014).
Li, H. et al., Desalination, 275, 62-66 (2011).
Li, Z. et al., Adv. Energy Mater., 3, 290-294 (2013).
Li, Z. et al., Electrochem. Commun., 44, 12-15 (2014).
Lipson, A.L. et al., Chem. Mater., 27, 8442-8447 (2015).
Liu, G. , J.. Electrochem. Soc., 154, A1129-A1134 (2007).
Mekonnen, M. et al., Sci. Adv., 2, e1500323 (2016), pp. 1-7.
Napov, A. et al., SIAM J. Sci. Comput., 34, A1079-A1109 (2012).
Nemani, S. et al., J. Electrochem. Soc., 162, A1415-A1423 (2015).
Notay, Y., SIAM J. Sci. Comput., 34, A2288-A2316 (2012).
Notay, Yvan, AGMG Software and Documentation, http://homepages.ulb.ac.be/~ynotay/AGMG (2015), 1 page.
Notay, Yvan, Electron. Trans. Numer. Anal., 37, 123-146 (2010).
Ong, S.P. et al., Energy Environ. Sci., 4, 3680 (2011).
Palomares, V. et al., Energy Environ. Sci., 6, 2312 (2013).
Park, S.I. et al., J. Electrochem. Soc., 158, A1067-A1070 (2011).
Pasta, M. et al., La Mantia, Nano Lett., 12, 839-843 (2012).
Perkins, T.K. et al., Soc. Pet. Eng. J., 3, 70-84 (1963).
Porada, S., Prog. Mater. Sci., 58, 1388-1442 (2013).
Qu, J-X et al., Desalination, 46, 233-242 (1983).
Rard, J.A. et al., J. Solut. Chem., 8, 701-716 (1979).
Sadrzadeh, M. et al., Desalination, 221, 440-447 (2008).
Sauvage, F. et al., Inorg. Chem., 46, 3289-3294 (2007).
Schiermeier, Q. , Nature, 505, 10-11 (2013).
Scialdone, O. et al., J. Electroanal. Chem., 681, 66-75 (2012).
Scialdone, O. et al., J. Electroanal. Chem., 704, 1-9 (2013).
Shannon, M. A., Nature, 452,301-310 (2008).
Smith, K.C. et al., J. Electrochem. Soc., 161, A486-A496 (2014).
Song, J. et al., J. Am. Chem. Soc., 137, 2658-2664 (2015).
Strathmann, H. , Desalination, 264, 268-288 (2010).
Strathmann, H. et al., Membrane Handbook, W. S. W. Ho and K. K. Sirkar, Editors, p. 223-229, Springer US (1992) http://link.springer.com.proxy2.library.illinois.edu/chapter/10.1007/978-1-4615-3548-5_17.
Subramanian, V.R. et al., J. Electrochem. Soc., 152, A2002 (2005).
Suss, M.E. et al., Energy Environ. Sci., 5, 9511-9519 (2012).
Tevar, A.D. et al., J. Electrochem. Soc., 157, A870 (2010).
Thomas, Karen E. et al., Mathematical Modeling of Lithium Batteries, Advances in Lithium-Ion Batteries, 2002, pp. 1-48.
Veerman, M. et al., Appl. Electrochem., 40, 1461-1474 (2010).
Weber, A.Z. et al., J. Appl. Electrochem., 41, 1137 (2011).
Werber, J.R. et al., Nat. Rev. Mater., 1, 16018 (2016).
Wessells, C.D. et al., Nano Lett., 11, 5421-5425 (2011).
Wessells, C.D. et al., Nat. Commun., 2, 550 (2011).
Whitacre, J.F. et al., Electrochem. Commun., 12, 463-466 (2010).
White, R. et al., J. Electrochem. Soc., 133, 485-492 (1986).
Wu, W. et al., J. Electrochem. Soc., 160, A497-A504 (2013).
Wu, X., ChemSusChem, 7, 407-411 (2014).
Wu, X. et al., Electrochem. Commun., 31, 145-148 (2013).
Xu, M. et al., RSC Adv., 4, 38140 (2014).
Xu, T. et al., AIChE J., 54, 3147-3159 (2008).
Zhang, Leyuan et al., Morphology-Dependent Electrochemical Performance of Zinc Hexacyanoferrate Cathode for Zinc-Ion Battery, Sci. Rep., 5, 18263 (2015), pp. 1-35.
Zhao, R., Desalination, 330, 35-41 (2013).
Zhou, X. et al., J. Mater. Chem. A, 1, 2757 (2013).
Kim, Taeyoung et al., Low Energy Desalination Using Battery Electrode Deionization, Environ. Sci. Technol. Lett., Sep. 21, 2017, pp. 1-6.
Lee, Jaehan et al., Rocking Chair Desalination Battery Based on Prussian Blue Electrodes, ACS Omega 2017, 2, 1653-1659, Apr. 26, 2017.
Liu, Sizhe et al., Intercalated Cation Disorder in Prussian Blue Analogues: First-Principles and Grand Canonical Analyses, J. Phys. Chem. C, Mar. 22, 2019, pp. 1-14.
Liu, Sizhe et al., Modeling of electrochemical deionization across length scales: Recent accomplishments and new opportunities, Current Opinion in Electrochemistry, May 21, 2020, 22:72-79.
Liu, Sizhe et al., Quantifying the trade-offs between energy consumption and salt removal rate in membrane-free cation intercalation desalination, Electrochimica Acta 271, Mar. 13, 2018, 652-665.
Porada, Slawomir et al., Nickel Hexacyanoferrate Electrodes for Continuous Cation Intercalation Desalination of Brackish Water, Electrochimica Acta 255, Sep. 23, 2017, 369-378.

(56) References Cited

OTHER PUBLICATIONS

Rassat, S.D. et al., Development of an electrically switched ion exchange process for selective ion separations, Separation and Purification Technology 15 (1999) 207-222.

Reale, Erik R., et al., Effect of conductive additives on the transport properties of porous flow-through electrodes with insulative particles and their optimization for Faradaic deionization, Water Research 165, Aug. 17, 2019, 114995, pp. 1-21.

Shrivastava, Aniruddh et al., Electron Conduction in Nanoparticle Agglomerates Limits Apparent Na+ Diffusion in Prussian Blue Analogue Porous Electrodes, Journal of the Electrochemical Society, 165 (9) A1777-A1787, Jun. 13, 2018.

Shrivastava, Aniruddh et al., Linking capacity loss and retention of nickelhexacyanoferrate to a two-site intercalation mechanism for aqueous Mg2+ and Ca2+ ions, Phys.Chem.Chem.Phys., Aug. 28, 2019, 21, 20177-20191.

Smith, Kyle C. et al., Na-Ion Desalination (NID) Enabled by Na-Blocking Membranes and Symmetric Na-Intercalation: Porous-Electrode Modeling, Journal of the Electrochemical Society, 163 (3) A530-A539, Jan. 5, 2016.

Smith, Kyle C., Theoretical evaluation of electrochemical cell architectures using cation intercalation electrodes for desalination, Electrochimica Acta 230, Feb. 4, 2017, 333-341.

Sukamto, J.P.H. et al., Electrochemical Ion Exchange, III/ Electrochemical Ion Exchange, 2000, pp. 1-11.

\* cited by examiner

100

1000

DESALINATON DEVICES

CROSS-REFERENCE TO RELATED APPLICATIONS

This application claims the benefit of U.S. Provisional Patent Application Ser. No. 62/427,502, entitled Desalination Devices, filed Nov. 29, 2016, which is incorporated by reference herein in its entirety.

FIELD OF THE DISCLOSURE

The subject disclosure relates generally to desalination devices.

BACKGROUND

Widespread water scarcity makes cheap, high efficiency desalination systems a global priority.[1] Recent analysis shows that the majority of the world's population experiences water scarcity for at least one month of the year.[2] Water reuse and desalination of salt-rich water sources (e.g., sea and brackish water) could reduce the burden of freshwater scarcity.[3] Worldwide installed seawater and brackish water desalination capacity has been increasing at a rate of ~40% per year in the last decade[4] due to population growth, aquifer shrinkage, and industrial utilization. This increase in worldwide installed desalination capacity has been driven by reverse osmosis, multi-stage flash, and multiple-effect distillation technologies.[5,6] Electrochemical desalination systems, which include electrodialysis and capacitive deionization, are also viable technologies that have been limited to usage in high-recovery and brackish-water desalination respectively.

Capacitive deionization (CDI) was first developed in the 1960s,[7] and uses the electric double-layers (EDLs) of high surface-area porous carbon to store cations and anions in solution in order to efficiently desalinate sea or brackish water.[8] Recent capacitive-deionization systems use membranes[9,10], flow-through electrodes[11], and hybrid CDI[12] systems to improve desalination performance. Other efforts in the CDI literature have been aimed at increasing salt removal, including through the use of flow electrodes[13] and a hybrid arrangement of Na-ion and capacitive electrodes.[12,14] CDI cells have also been developed with IEMs arranged on the surface of electrodes (MCDI), so as to minimize co-ion expulsion within EDLs.[9] Novel bi-porous carbons have also been employed to enable flow of electrolyte through the thickness of electrodes, rather than along the electrode's length.[11] To enable desalination of seawater-level salt concentrations, other devices have employed solid-state Faradaic electrode reactions in lieu of capacitive electrodes. Specifically, the desalination battery used a Na-ion intercalation cathode paired with a Ag/AgCl conversion anode.[15]

Electrodialysis systems, used since the 1960s[16] as a competitor to early reverse osmosis technologies, have improved cycling efficiency using electrodialysis reversal (EDR),[17] and charge isolation using porous separators instead of membranes for shielding.[18,19,20] Pressure-driven reverse osmosis technology has substantial installed capacity around the world[3,21] but requires large-scale plants to desalinate water efficiently.[5] Alternative membrane technologies exist to desalinate water using electric potential as a driving force. Electrodialysis (ED) is the most developed of such technologies and has found extensive use in demineralization of salt-containing solutions.[22]

In ED, Faradaic reactions are used to induce electric potential drop across a stack of ion-exchange membranes (IEMs) with alternating selectivity toward cations and anions. When saline source water is pumped through flow channels between IEMs their selectivity enables the generation of alternating streams of concentrated brine and desalted water, referred to as concentrate and diluate respectively.[23] Conventional ED stacks use gas-evolution reactions (e.g., $H_2$ and $O_2$ gases[24]) to generate ionic current, and as a result costly metals,[25] large stacks, and continuous supply of consumable electrolyte are required.

Solid and solution-phase electrode processes offer benefits over the gas-evolution reactions used in conventional ED. Along these lines, reactions involving iron-based redox couples in solution, including hexacyanoferrates (Fe$(CN)_6^{4-}$/Fe$(CN)_6^{3-}$), have been evaluated for use in reverse electrodialysis,[26,27,28] but their performance may be limited by crossover through IEMs due to their mobility in solution (as is commonly encountered in flow batteries using dissolved redox couples[29]).

Recently, devices that induce localized electric fields have been used to desalinate water, including the ion-concentration polarization[30] (ICP) and electrochemically mediated desalination[31] (EMD) methods. Similarly, the electric field inside Li-ion batteries can induce the simultaneous depletion of salt in one electrode and accumulation in the opposing electrode when cycled at high rate. This "salt depletion effect" can limit cycling capacity of Li-ion batteries,[32] and consequently energy-storage devices are engineered to prevent it from occurring.

Na-ion intercalation materials have historically been researched for energy storage.[33] Recent successful demonstrations of Na-ion batteries (NIBs) using NaTi$(PO_4)_2$,[34] Na$_{0.44}$MnO$_2$,[35,36] Na$_2$CuFe$(CN)_6$,[37] and Na$_{2.55}$V$_6$O$_{16}$,[38] have renewed interest in Na-ion intercalation materials.[39,40] While capacity and energy density are not as high as in Li-ion batteries,[41] recent developments in NIBs suggest that they can be manufactured cheaply and electrode active materials can be synthesized by various methods.[42,43,44,45,46] Improvements in the capacity and cycle life of NIBs have also been obtained recently.[3,20,47,48] NIB intercalation host compounds (IHCs) have been used for desalination in hybrid CDI cells in the past.[12]

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features, objects and advantages other than those set forth above will become more readily apparent when consideration is given to the detailed description below. Such detailed description makes reference to the following drawings, wherein.

Figure 1:
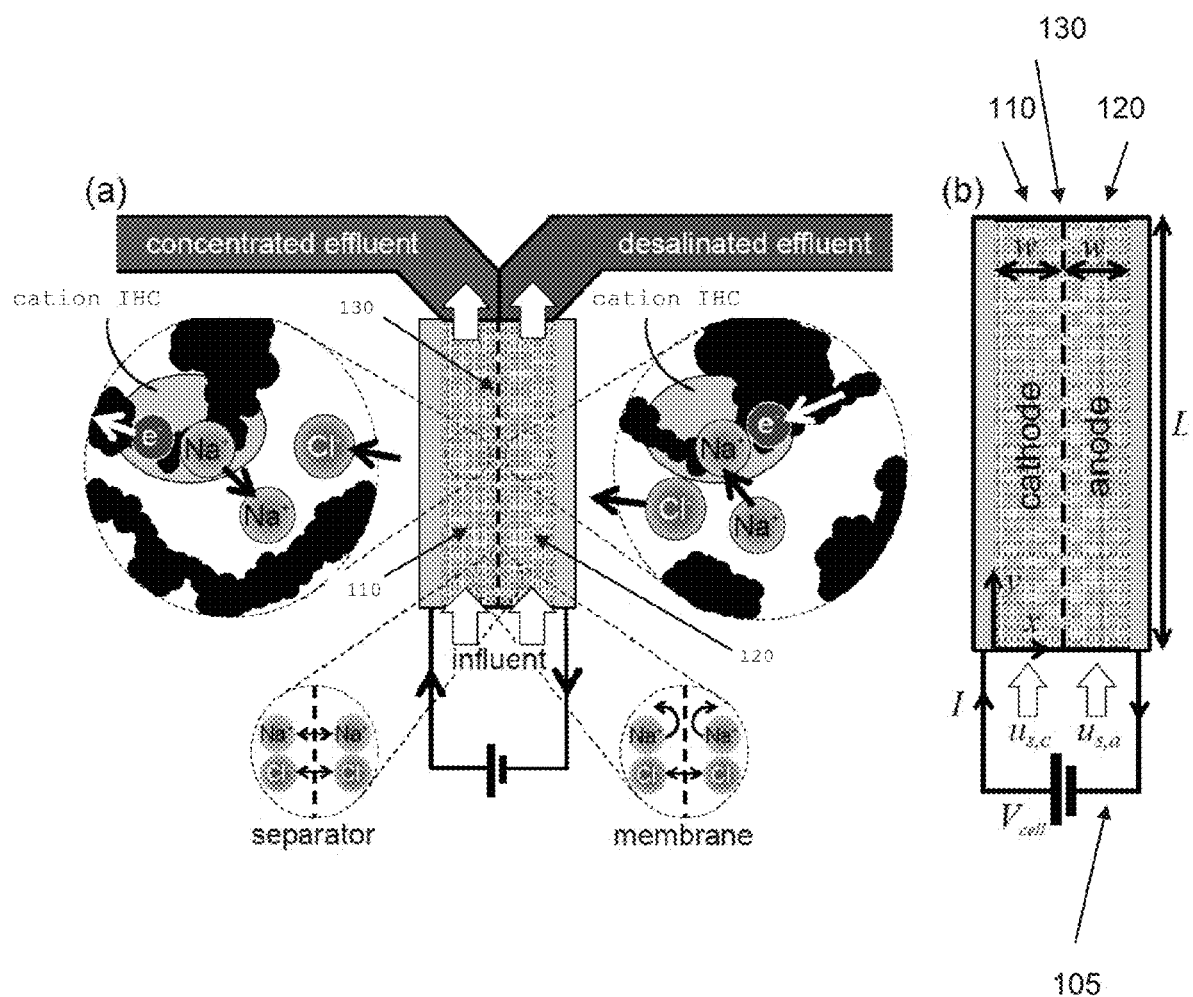
FIGS. 1a-b. Schematic of the desalination device of interest during a charging cycle: (a) Na ions in the cathode (left) de-intercalate from electrode active material into the electrolyte, while Na ions in the anode (right) intercalate into electrode active material. Here, note that the terms "cathode" and "anode" are used, respectively, to refer to the positive and negative terminals across which cell voltage was measured. This is conventional nomenclature used in the rechargeable Li-ion and Na-ion battery communities, but, strictly speaking, these designations are consistent with the definitions of cathodic and anodic processes only during cell discharging (i.e., when current flows from the negative to the positive electrode) and not during cell charging. The solution-phase Na-ion concentration-difference between the electrodes drives Cl-ion migration from the anode to the cathode, which in turn concentrates the cathode solution in both Na and Cl ions, while the anode solution is diluted in both. (b) The coordinate system and cell dimensions are shown (x perpendicular to the current collector and y along the flow direction).

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The devices now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the devices described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Overview

The exemplary embodiments demonstrate the stability of intercalation host compounds in seawater and corroborated earlier attempts to use $Na_{0.44}MnO_2$ in a desalination cell.[15] An electrochemical cell that uses Na-ion intercalation in both electrodes (as in the NID cell introduced here) provides enhanced volumetric desalination capacity over a hybrid CDI cell, because Na-ion intercalation host compounds store charge inside electroactive particles while capacitive desalination only stores charge in the Helmholtz double-layer.[8]

In one or more embodiments, the Na-Ion Desalination (NID) cell described herein can exploit the "salt depletion effect" by blocking Na transport between opposing electrodes to maximize the degree of salt depletion.

The materials, system, and porous-electrode model used in the exemplary embodiments are described herein. The electrochemical processes that occur during cell cycling are then elucidated by examining the transient distributions of intercalated Na in electroactive particles and of salt in the electrolyte. Subsequently, performance is quantified for a range of applied current density and electrode thickness, after which the influence of influent salt-concentration and water-recovery is explored.

One aspect of the exemplary embodiments provides a desalination device (e.g. Na-Ion Desalination (NID) cell). NID deionizes ions such as NaCl from aqueous solutions using intercalation-electrodes separated by a cation-blocking anion-exchange membrane. These devices can be constructed with either a symmetric configuration in which the same intercalation host compound is used on both sides of the cell or in an asymmetric configuration in which different intercalation host compounds are used within the cell's two electrodes. Simulated results from a two-dimensional, flowing porous-electrode model show that the type of Na-ion intercalation host compound used affects energy consumption. The simulation shows that the exemplary embodiments can efficiently desalinate seawater at a water recovery of 50% with 0.92 kWh/m$^3$ desalination energy. Comparison of performance between cells with a Na-ion battery-separator and an anion-selective membrane indicates that selectivity is essential to achieve substantial degrees-of-desalination. Better Na-ion electrode active materials may be available[38], as well as improvements to the NMO material itself using nanowires[47] or sub-micron slabs[48] that double its capacity. Further, current-density and electrode-thickness ranges are identified that minimize energy consumption and maximize desalinated water throughput. Water-recovery levels as high as 80% are achievable with 700 mM influent (where it is limited by NaCl solubility), while water-recovery levels up to 95% were predicted for 70 mM influent.

Another aspect of the exemplary embodiments is an electrodialysis stack. The electrodialysis stack can also achieve desalination utilizing porous intercalation electrodes instead of the electrolysis reactions used in conventional electrodialysis. The Na-ion intercalation compounds described in the exemplary embodiments can be used as efficient and reversible electrodes for electrodialysis. Electrodialysis stacks using Na-ion intercalation electrodes can desalinate large volumes of water efficiently when optimized flow configurations are employed. Distribution of ionic current within flow channels is biased toward the inlet when concentrate and diluate streams flow in the same direction (i.e., parallel-flow configuration), but these effects can be mitigated by flowing concentrate and diluate streams in opposing directions (i.e., in counterflow configuration). Performance can be further enhanced with forced convection of electrolyte within intercalation electrodes and recirculation of electrolyte through flow channels. The energy consumption per unit diluate volume decreases as the number of membranes or flow channels is increased in the stack, showing the promise of using Na-ion electrodes for efficient electrodialysis.

The present porous-electrode model explicitly captures two-dimensional ion transport within all flow channels of the electrodialysis stacks considered. In contrast, many previous two-dimensional electrodialysis models begin with a periodically repeating domain that cannot capture the asymmetric current distributions observed here. Accordingly, results described in the exemplary embodiments suggest that similar non-uniform current distributions could manifest in conventional electrodialysis, and stack performance could be enhanced by using the proposed counterflow arrangement. Furthermore, Na-ion electrodialysis stacks could be used in reverse electrodialysis to harvest energy from salinity gradients introduced by flowing influent of dissimilar salt concentrations into the stack.

While $Na_{0.44}MnO_2$ (NMO) and $NaTi_2(PO_4)_3$ (NTP), exhibit sizable volumetric charge capacities as electrode active materials (approximately 200 mAh/mL-NMO[36] and 400 mAh/mL-NTP[55]), the abuse tolerance of these materials may be limited due to the degradation of NMO as a result of over (dis)charge[35] and the propensity of NTP to hydrolyze in moderate pH solutions.[46,55] Thus, in a separate embodiment of the exemplary embodiments, Prussian Blue Analogues (PBAs) can be used as electrode active material. The open framework structure of PBAs enables facile intercalation and long cycle life in various aqueous cation batteries (including $Na^+$,[37,49,50,54] $K^+$,[49,50] $Ca^{2+}$,[84] and $Zn^{2+}$,[85] among other ions in general electrochemical cells[86]). PBAs are hexacyanometallate compounds, which use the same redox-active unit as hexacyanoferrate ionic complexes,[26,27,28] but are insoluble in aqueous and non-aqueous electrolytes due to their bonding with transition metals (e.g., nickel,[49] copper,[50] and manganese[51]). Because of their open-framework structure, PBAs show substantially lower volumetric charge capacity than NMO and NTP (approximately 100 mAh/mL-PBA[49]). Despite its low charge storage capacity, nickel-hexacyanoferrate Prussian Blue Analogue is capable of continuously removing 500 mM NaCl from 700 mM influent. PBAs can be used as electrode active material in either the NID aspect or the electrodialysis stack aspect of the exemplary embodiments. Aside from energy storage, nickel hexacyanoferrate (NiHCF) and copper hexacyanoferrate PBAs have recently been used to harvest energy from salinity gradients in aqueous NaCl solutions.[52,53] In addition, these materials can be synthesized in Na-rich[37,54] and Na-deficient[49,50] forms, enabling the construction of symmetric NID cells.

The sodium ion intercalation host compound of the exemplary embodiments can include, but is not limited to, $Na_{0.44}MnO_2$ (NMO), lamda-$MnO_2$, gamma-$MnO_2$, delta-$MnO_2$, $Na_2FeP_2O_7$, $Na_3V_2(PO_4)_3$, $NaVPO_4F$, $NaCo_{1/3}Ni_{1/3}Mn_{1/3}PO_4$, olivine $Li_xMePO_4$, $NaTi2(PO_4)_3$ (NTP), nickel-hexacyanoferrate (NiHCF) Prussian Blue Analogues (PBAs), copper-nickel-manganese mixture hexacynanoferrate PBAs, nickel-copper-manganese mixture hexacyanomanganate PBAs, and vanadium oxides.

FIGS. 1a-b show one aspect of the exemplary embodiments, a Na-ion desalination device 100, in two-dimensional form. The device can be a symmetric electrochemical cell, meaning that it contains the same type of electrode active material (also referred to as "intercalation host compound") in both electrodes rather than dissimilar intercalation host compounds used in conventional NIBs, although dissimilar intercalation host compounds can be used in another embodiment. These electrodes 110, 120 are chosen with common thickness w and length L (FIG. 1b), although differing thickness and/or width for the electrodes can be utilized in another embodiment. The electrodes 110, 120 are porous composites, which enables them to conduct electrons and ions along the x-direction while saline or other aqueous solution flows through them along the y-direction (FIG. 1b). The two electrodes 110, 120 are isolated by a membrane 130. The membrane 130 (FIG. 1a) can be selected from a polymeric separator or an anion-selective membrane. FIG. 1 illustrates the cation Intercalation Host Compound (IHC).

At the beginning of the charge process via circuit 105 (i.e., when the cell is in the fully "discharged" state), electrode active material in the positive electrode 110 (also referred to as "cathode") acts as a source of Na, while electrode active material in the negative electrode 120 (also referred to as "anode") acts as a sink. Both electrodes 110, 120 contain electrolyte with a certain initial concentration defined by the water source of choice (including sea- or brackish-water, among other aqueous solutions). When charging starts, electrons are released into conductive carbon from the electrode active material in the cathode 110, which de-intercalates cations from the electrode active material into the solution that flows through the cathode (FIG. 1a). This electrochemical reaction induces solution-phase charge-imbalance that drives anions from the anode 120 across the separator or membrane 130 to the cathode 110 and concentrates solution in the cathode with Na and Cl ions. A diluted solution forms in the anode 120 (FIG. 1a, right inlay) in which electrons enter the electrode active material, causing cations to intercalate into electrode active material and forcing anions to leave the anode. This process depletes the aqueous solution in the anode 120 with anions and cations. Due to the cathode solution being concentrated and the anode solution being diluted simultaneously, effluent streams of two disparate salt concentrations are generated (FIG. 1a, top). The situation is reversed during the discharge cycle, where cathode solution depletes while anode solution concentrates in Na and Cl ions. Since the accumulating and depleting streams are switched during the discharge cycle, the concentrated effluent and desalinated effluent outlet lines and tanks would be switched when the current direction is switched in a practical device.

The simultaneous accumulation and depletion of electrolyte-phase salt ions in opposing electrodes is known as the salt depletion effect, which was first observed in rocking-chair Li-ion batteries.[32] The NID aspect of the exemplary embodiments uses porous electrodes as found in conventional CDI and anion exchange membranes as found in electrodialysis, however it differs from both because it uses Na-ion intercalation host compounds to store charge. In addition, the change in cell polarity between the charge and discharge cycles is similar to electrodialysis reversal,[17] which should decrease membrane fouling since there is no buildup of anions at the anion perm-selective membrane. Finally, the anion perm-selective membrane, using the Gibbs-Donnan effect, can sustain a large concentration gradient between the electrodes, allowing significant desalination in the depleted electrode.

The NID cell described in the exemplary embodiments uses porous electrodes for Na-ion intercalation, ion transport in flowing NaCl solution, and electron transport inside flow-through electrodes. Overpotential η drives Na-ion intercalation in solid electroactive particles and is defined as $\eta = \phi_s - \phi_e - \phi_{eq}$, where $\phi_s$, $\phi_e$, and $\phi_{eq}$ are the solid-phase potential of the electronic conductor, solution-phase potential of $Na^+$, and the equilibrium potential of Na-ion intercalation, respectively. The solid- and solution-phase potentials are coupled through their respective current-conservation equations. The equilibrium potentials of NTP and NMO vary with the fraction of intercalated Na, $x_{Na}$ (defined as the intercalated Na concentration divided by the terminal value). The equilibrium potentials used here, shown in FIG. 2, were estimated from the absolute electrode potentials (i.e., versus a Ag/AgCl reference) measured during charge and discharge of an experimental NMO/NTP cell[55] at 0.6 C rate. The terminal concentration of intercalated Na ($c_{s,max}$) by which intercalated-Na fraction is normalized was taken as 14,687 mol-Na/$m^3$ and 8.095 mol-Na/$m^3$ for NTP and NMO respectively. These concentrations were chosen to produce theoretical capacities of 133 mAh/g-NTP and 50 mAh/g-NMO reported previously in the literature.[55] The reaction current-density $i_n$ for intercalation at the surface of electroactive particles is modeled using the Butler-Volmer equation:[56]

$$i_n = i_0 \left[ \exp\left(\frac{0.5 F \eta}{R_g T}\right) - \exp\left(-\frac{0.5 F \eta}{R_g T}\right) \right] \quad (1)$$

where $R_g$, T, and F are the universal gas constant, temperature, and Faraday's constant, respectively. The exchange-current density $i_0$ for intercalation reactions[57] depends on salt concentration in the electrolyte $c_e$, the number of cations formed from dissociation of one salt molecule $s_+$, the fraction $x_{Na}$ and the terminal concentration $c_{s,max}$ of intercalated Na ion electroactive particles, and the kinetic rate-constant k:

$$i_0 = F k c_{s,max} (s_+ c_e)^{0.5} (1-x_{Na})^{0.5} (x_{Na})^{0.5} \quad (2)$$

To predict measurements of Na-ion intercalation kinetics for NTP and NMO, polarization data at several C-rates[55] was fitted to predictions by adjusting the rate constant for NTP and NMO independently, the outcomes of which are described in the next sub-section. In this procedure, NTP and NMO had Na-intercalation rate-constants of $6.31 \times 10^{-13}$ and $2.12 \times 10^{-11}$ mol/m²-s per (mol/m³)$^{1.5}$, respectively.

The fraction of intercalated Na inside solid electroactive-particles increases when intercalation reactions occur with the electrolyte. The intercalated-Na fraction can vary throughout the electroactive particles. However, due to the large Na-ion diffusivity in NMO and NTP (greater than $10^{-16}$ m²/s in NTP[55] and between $1 \times 10^{-17}$ and $9 \times 10^{-16}$ m²/s in NMO[78]), this variation is less than 10% in both NTP and NMO.[79] Consequently, this effect was neglected. Intercalated-Na fraction $x_{Na}$ (at a particular point inside a given electrode) evolves with time (according to mass conservation) as a result of intercalation current-density $i_n$ at electroactive-particle surfaces, $$v_s c_{s,max} \frac{\partial x_{Na}}{\partial t} + a v_s \frac{i_n}{F} = 0 \quad (3)$$

where a and $v_s$ are the volumetric surface area and volume fraction of electroactive particles in the porous electrode, respectively. The volumetric surface area of electroactive particles is $5.73 \times 10^6$ m$^{-1}$ and $2.14 \times 10^7$ m$^{-1}$ for NMO and NTP respectively (assuming spherical particles whose size was measured in Ref. 55).

Na ions are removed from flowing electrolyte as Na intercalates into electroactive particles. Thus, balance of species must be accounted for in a desalination device to preserve solution-phase electroneutrality. Flow of electrolyte is modeled through porous electrodes (containing electrode active material comprised of electroactive particles, electronically conductive carbon, and polymeric binder) using Darcy's Law. When the fluid permeability of the separator/membrane is neglected, the superficial-velocity of electrolyte $\vec{v}_s$ is uniform and one-dimensional (i.e., $\vec{v}_s = u_s \hat{i}$). For the present binary electrolyte, the transport of Na$^+$ and Cl$^-$ is modeled using dilute-solution theory that is cast in terms of the solution-phase potential $\phi_e$ of the cation (here, Na$^+$) and salt concentration $c_e$. Salt conservation in the electrolyte can be described by a potential-independent equation for binary electrolytes[58]

$$\varepsilon \frac{\partial c_e}{\partial t} + \vec{v}_s \cdot \nabla c_e + \nabla \cdot (-D_{\textit{eff}} \nabla c_e) - a v_s (1-t_+) \frac{i_n}{s_+ F} = 0 \quad (4)$$

Salt concentration inside of each electrode is assumed to be uniform initially with the same concentration as the influent solution (that is chosen based on the specific operating conditions investigated). The rightmost term in Eq. 4 above is the local rate of salt accumulation (in mol/L-s) that is driven by exchange of Na ions between electroactive particles and electrolyte. This rate is affected by the Na-intercalation current-density $i_n$, volumetric surface area of electroactive particles a, their volume fraction $v_s$, and the electrolyte's Na-ion transference number $t_+$. Equation 4 above assumes a concentration-independent transference number for Na ions $t_+$ of 0.39 (from the dilute-limit value), which deviates by less than 10% in concentrated solutions.[59] $D_{\textit{eff}}$ is the effective salt diffusivity, which is reduced from the bulk value $D_0$ (taken as $1.61 \times 10^{-9}$ m²/s for dilute NaCl[58]) by a factor $D_{\textit{eff}}/D_0 = \varepsilon^{1.5}$ (assuming Bruggeman scaling) that depends on porosity of the electrode $\varepsilon$. Here, the effect of pore-scale dispersion on apparent diffusion through the porous electrode (assuming small pore-scale Peclet number[60]) was neglected.

Charge transport in the electrolyte is governed by current conservation.[58]

$$\nabla \cdot \left[ -\kappa_{\textit{eff}} \left( \nabla \phi_e - \frac{2 R_g T}{F} (1-t_+) \nabla \ln c_e \right) \right] - a v_s i_n = 0 \quad (5)$$

where $\kappa_{\textit{eff}}$ is the effective ionic conductivity that depends on the corresponding bulk value $\kappa_0$ and porosity as $\kappa_{\textit{eff}} = \varepsilon^{1.5} \kappa_0$ (assuming Bruggeman scaling). Here, the local ionic current-density is $\vec{i}_e = -\kappa_{\textit{eff}} (\nabla \phi_e - (2 R_g T/F)(1-t_+) \nabla \ln c_e)$. Experimental data[61] was used to model the dependence of bulk ionic-conductivity on salt concentration.

When a Na-blocking membrane is used to isolate the two electrodes, boundary conditions must be expressed on its opposing sides (labeled here as + and − for cathode and anode sides, respectively). A Neumann condition was imposed on the solution-phase potential at these boundaries (i.e., $-\hat{n} \cdot \nabla \phi_e = 0$, where $\hat{n}$ is the outward-pointing unit-normal for a given side of the membrane) to enforce null Na-ion transport through an ideal perm-selective membrane. This condition is equivalent to a null-flux condition on cation transport because the solution-phase potential is proportional to the electrochemical potential of the cation that is the driving force for diffusive and migrational transport of the cationic species.[70]

Additionally, solution-phase potential is not continuous across the membrane because concentration polarization is produced by the difference in salt concentration inside electrolyte between opposing sides of the membrane. Assuming that the perm-selective membrane is close to equilibrium, the drop in electrostatic potential across the membrane (from cathode to anode) is given by[80] $\phi_{ES,+} - \phi_{ES,-} = R_g T/F \ln(c_{e,+}/c_{e,-})$. The solution-phase potential $\phi_e$ represents the reduced electrochemical-potential of the cationic species Na$^+$ (see Ref. 70), which is defined as[58] $\phi_e = \phi_{ES} + R_g T/F \ln(c_e)$. Using this relationship, the solution-phase potential-drop across the membrane is twice that of the electrostatic potential $\phi_{e,+} - \phi_{e,-} = 2 R_g T/F \ln(c_{e,+}/c_{e,-})$. Accounting for potential drop in this way is necessary for accurate modeling of the thermodynamic limit of desalination for a device using a membrane. When a porous separator is used to isolate anode and cathode, the separator's thickness and permeability was neglected, in which case Eqs. 4 and 5 above are continuously differentiable across the separator and do not require additional boundary conditions. Current-collector and outflow boundaries are modeled as impenetrable to ionic diffusion and migration, and consequently null-flux conditions are applied to diffusive salt transfer and ion current on these boundaries (i.e., $-\hat{n} \cdot D_{eff} \nabla c_e = 0$ and $\hat{n} \cdot \vec{i}_e = 0$ on the boundary whose outward-pointing unit-normal is $\hat{n}$). At inflow boundaries a constant-concentration (i.e., Dirichlet) condition is imposed to account for salt diffusion between the cell and the reservoir that feeds saline water to it. A null ionic-current is also imposed on such boundaries, as though an insulator were placed between the influent streams feeding the two electrodes so as to eliminate shunt currents[62] between them.

Finally, electron conduction to and from the external circuit into the composite electrodes is necessary to make the cell operate. The current collectors that adjoin the respective electrodes are assumed to have uniform solid-phase potentials ($\phi_{s,+}$ and $\phi_{s,-}$ are used to denote the solid-phase potential of cathode and anode current collectors, respectively). Cell voltage (defined as $V_{cell} = \phi_{s,+} - \phi_{s,-}$) is adjusted to maintain the average current-density i applied to the current collector at a specified time-independent value (i.e., galvanostatic conditions are imposed) while the anode solid-phase potential $\phi_{s,-}$ is grounded at 0 V. Separators and membranes are considered perfect electronic insulators. Solid-phase potential variations inside the porous electrode are governed by current conservation:

$$\nabla \cdot (-\sigma_s \nabla \phi_s) + a v_s i_n = 0 \qquad (6)$$

where $\sigma_s$ is the effective electronic conductivity of the heterogeneous electrode. Here, a value of 100 S/m is taken, which results in small solid-phase potential variations relative to that of the solution-phase potential in the electrolyte. This value is reasonable, considering that Li-ion porous-electrode films can be fabricated with effective electronic conductivity of 20-400 S/m depending on binder and carbon content.[81] Further, ohmic polarization inside the cell is dominated by bulk ionic-transport resistance when effective electronic-conductivity exceeds the effective ionic-conductivity (here, 1.6 S/m at 700 mol/m$^3$ salt concentration with 40% porosity). The results are insensitive to the choice of effective electronic-conductivity.

Numerical Discretization, Model Implementation, and Validation

The coupled modeling equations were discretized using the finite-volume method. A first-order implicit scheme was used to integrate in time, while a second-order central-difference scheme was used for non-convective flux and a first-order upwind-difference scheme was used for convective flux. An algorithm used previously to simulate suspension flow-batteries[82] was modified for use in desalination simulations by (1) incorporating electrolyte potential and concentration variations, (2) anchoring solid parts of the porous electrode, and (3) incorporating continuous flow of the liquid-phase electrolyte. Non-linearity of the discrete governing equations requires iteration to obtain a converged solution at a given time step. A sequence of iteration loops was used to solve the non-linear system of equations,[63] where electrolyte conductivity is resolved in the outer loop, electrochemical kinetics are resolved in the inner loop, and the aggregation-based algebraic multigrid method[64,65,66,67] is used as a linear solver.

The present model builds on a Li-ion battery model without electrolyte flow and whose solution-phase potential, solid-phase potential, and salt concentration fields were validated[63] by comparison with those predicted by the Dualfoil 5 program.[68,69] The present model captures additional transport processes, including (1) anion-selective membrane transport and membrane polarization, (2) continuously flowing electrolyte, and (3) Na-ion intercalation. To verify implementation and confirm the physical consistency of these additional model features, output predictions were compared with idealized, analytical models. Firstly, a symmetric-NMO cell with a membrane was simulated with stationary electrolyte disconnected from electrolyte reservoirs. The electrodes for these cells were chosen with 1 mm thickness, 20 mm length, 40 vol. % porosity, and 50 vol. % NMO loading. Under these conditions, transient salt-depletion occurs in one electrode while the opposing electrode concentrates simultaneously. Salt concentration and average membrane-polarization simulated at $5 \times 10^{-5}$ C differed respectively by $10^{-6}$% and 0.2% from the values expected based on average concentrations predicted by Faraday's Law ($\bar{c}_e(t) = c_e^0 \pm it/wF\varepsilon$, where $c_e^0$ is the initial concentration). After 5 hours of charging at $5 \times 10^{-3}$ C the concentration profile in the x-direction differed by $10^{-5}$% from that expected from a pseudo-steady solution of Eq. 4 above with uniform intercalation current-density ($c_e(x,t) = c_e^0 \pm i(t/\varepsilon + t_+ (x^2 - w^2/3)/2D_{eff})/wF$). The same cell was simulated with electrolyte connected to a stationary electrolyte-reservoir at its inlet. When cycled at $5 \times 10^{-6}$ C, both electrodes showed salt-concentration distributions in the y-direction that differed by less than 0.04% from those expected from a thickness-averaged, steady solution of Eq. 4 above with uniform intercalation current-density and with membrane current-density localized at the inlet ($c_e(y) = c_e^{in} \pm iy(L - 0.5y)(1 - t_+)/2wFD_{eff}$, where $c_e^{in}$ is the inlet concentration). With flowing electrolyte at a superficial velocity of 22 μm/s, the time-averaged effluent-concentration in the desalinated electrode differed by 1% from that predicted by Faraday's Law when cycled at C/2 rate ($\bar{c}_e^{out} = c_e^{in} \pm iL/wFu_s$).

The model predictions of individual-electrode polarization were fitted at 6 C and 12 C for an asymmetric NMO/NTP cell with aqueous $Na_2SO_4$ electrolyte to experimental data[55] to estimate the kinetic rate-constants of NTP and NMO Na-ion intercalation. No other adjustable parameters were fitted. As Table 1 shows, the model produced polarization levels within 20% of the experimental values between 6 C and 12 C on both electrodes, i.e., this accuracy was obtained by fitting four polarization values with two kinetic parameters. Experimental polarization at 0.6 C (from Ref. 55) was not compared to the model because cycling at that rate produced low experimental coulombic efficiency (~90%) relative to that of 6 C and 12 C (>98%), suggesting that side reactions affect cycling substantially at that rate. The charge capacities predicted between 6 C and 12 C exceed experimental values by 20-30 mAh/g-NTP (the experimental capacity was 104 mAh/g-NTP at 6 C versus a modeled capacity of 126 mAh/g-NTP). This discrepancy is not unexpected considering that the present model neglects the effects of side reactions and electroactive-material decomposition that have been reported for experimental NIBs using aqueous electrolyte.[34,55] The present model predicts the performance of NID cells, suggesting appositive outlook for the development of aqueous NIBs with long cycle-life (in which side and decomposition reactions have been mitigated).

TABLE 1

Comparison of polarization predicted by the present model
with previous experiments[38] on an NMO/NTP cell
in aqueous $Na_2SO_4$ electrolyte.

| Rate | Cathode Polarization (mV) | | Anode Polarization (mV) | | Total Polarization (mV) | |
|---|---|---|---|---|---|---|
| | Simulation | Experiment | Simulation | Experiment | Simulation | Experiment |
| 6 C | 29 | 35 | 125 | 145 | 154 | 180 |
| 12 C | 54 | 50 | 191 | 195 | 245 | 245 |

The development of efficient NID cells requires a careful choice of materials and dimensions used in the cell's construction. Additionally, the electrochemical-cycling and flow conditions used to operate the cell will affect its performance in a given application. These aspects of cell development were assessed by first examining how galvanostatic cycling is affected by the choices of Na intercalation host compound and the type of membrane or separator between the two electrodes. Then, the effect of average applied current-density and electrode thickness on cell-cycling performance were tested.

In one example, results were obtained for 700 mM-NaCl influent and 50% water recovery. Cell dimensions were 1 mm electrode thickness and 20 mm current-collector length, and the volume fraction of electrode-active-material loading was fixed to 50 vol. % (producing areal capacities of 10.2 mAh/cm² for NMO and 16.1 mAh/cm² for NTP) with 40 vol. % porosity and with binder and conductive-additive accounted for in the balance of electrode volume. Finally, optimized cells can be cycled efficiently with influent concentrations ranging between brackish water and seawater and with water recovery up to 95%. Electrochemical performance in each case was quantified based on the following metrics:

The desalination energy $E_d$ is calculated as the average energy consumed per unit volume of desalinated water as $E_d = L\int V_{cell} i dt/u_{s,d}\varepsilon w\Delta t$, where i is the space-averaged, applied current-density at a given instant in time, L is the length of the cell along the flow direction, w is the electrode thickness, $u_{s,d}$ the superficial velocity of desalinated water, and $\Delta t$ is the elapsed time.

The time-averaged polarization $\Delta\overline{\Phi}$ is calculated as 0.5 ($\overline{V}_{cell,C} - \overline{V}_{cell,D}$), where $\overline{V}_{cell,C}$ and $\overline{V}_{cell,D}$ are the time-averaged voltages on charge and discharge, respectively.

The degree of desalination s is calculated as $s = (c_e^{in} - \overline{c}_{e,desal}^{out})/c_e^{in}$, where the influent salt concentration is $c_e^{in}$ and the time- and space-averaged salt concentration of the desalinated effluent is $\overline{c}_{e,desal}^{out}$.

The utilization $\chi$ of electrode active-material charge-capacity is calculated as the time for a galvanostatic process to complete $\Delta t$ (between a specified window of cell-voltage cutoffs) relative to the ideal time $\Delta t_{ideal}$, which is determined by a cell's theoretical capacity and current applied to it.

Electrochemical Processes during Cell Cycling

Three types of symmetric Na-intercalation cells are simulated here with an average applied current density of 51 A/m²: (1) NMO electrode active material with a Na-blocking membrane, (2) NTP electrode active material with a Na-blocking membrane, and (3) NMO electrode active material with a porous separator that is not ion-selective. The targeted degree-of-desalination is 68%. A charge balance on the cell shows that achieving the 68% desalination target requires a pore-scale mean-velocity (i.e., the product of porosity and superficial velocity) of 56 µm/s, which corresponds to an intra-cell water residence-time of 360 seconds. Hence NMO cells, with a C-rate of 0.5, theoretically allow a net desalinated-water output that is 20 times the open-pore cell volume during each charge/discharge cycle. The flow velocity is equal in both electrodes to maintain 50% water recovery.

Figure 3:
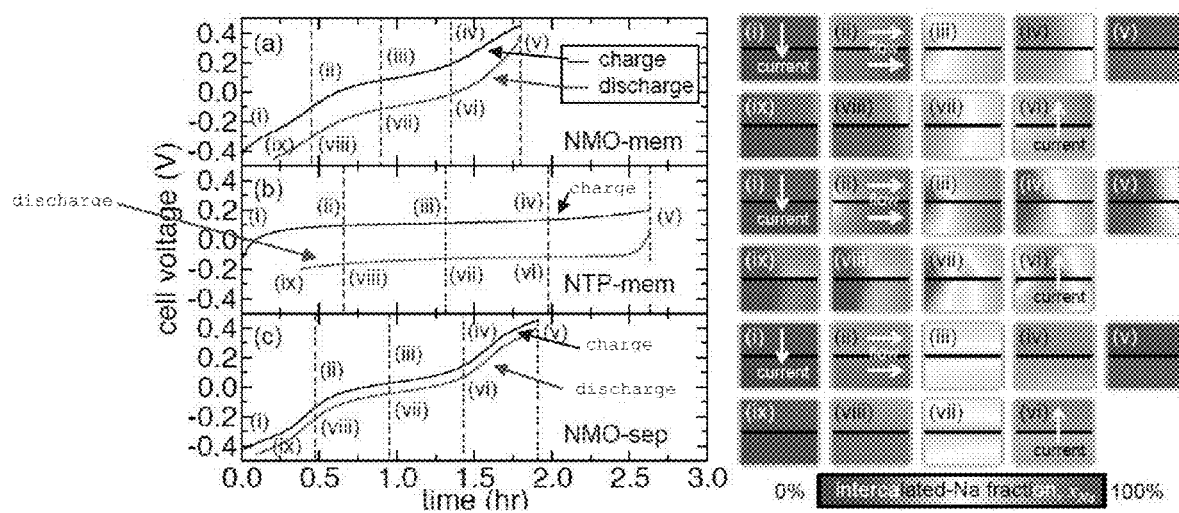
FIGS. 3a-c. Cell voltage as a function of time (left) during the first charge/discharge cycle of (a) NMO-membrane cell, (b) NTP-membrane cell, and (c) NMO-separator cell. At indicated instants in time (i-ix) the distribution of intercalated Na in electroactive particles is shown (right).

FIG. 3 shows the variation of cell voltage for the three cells of interest. The distribution of intercalated Na is shown at nine instants in time as well. Initially, electroactive particles in the cathode and anode, respectively, are concentrated with and depleted in intercalated Na (snapshot i in FIGS. 3a-c). This produces a negative cell voltage initially because equilibrium potential of a given electrode active material decreases with increasing intercalated-Na fraction, which requires each cell to operate in a mode where energy is recovered from the cell rather than delivered to it. As shown, the net energy consumed depends on the efficiency with which energy is recovered. Cell voltage increases during charging, becoming positive after a certain period of time that depends on the type of electroactive material used (NMO or NTP here). Charging stops once the cutoff cell-voltage is reached (chosen as 0.455 V for NMO and 0.200 V for NTP). For the NMO cells (FIGS. 3a, c) nearly complete utilization of electrode-active-material capacity is obtained (snapshot v), while electrode active material at the outlet of the NTP cell is underutilized at the end of the charge cycle (FIG. 3b, snapshot v). Despite this, the NTP cell cycles for a longer period of time (2.8 hr for NTP versus 1.9 hr for NMO) because NTP produces a higher areal capacity (16.1 mAh/cm²) than NMO (10.2 mAh/cm²).

When the direction of current is reversed, the cell begins to discharge current from the cathode and cell voltage decreases. Discharging stops once the low-potential cutoff-voltage is reached (−0.455 V for NMO and −0.200 V for NTP). The gap between the charge (black) and discharge (red) cell-voltage curves is equal to twice the cell polarization, which is a measure of the net amount of energy required to desalinate (without energy recovery losses). Among the three cells simulated, the NTP-Membrane cell shows the highest cell-level polarization, followed by the NMO-Membrane cell. The NTP-Membrane cell has highest polarization due to the low reaction rate-constant of NTP. Snapshots i-ix in FIGS. 3a,b show that a reaction zone propagates from the inlet to the outlet in the two cells having Na-blocking membranes, while a separator allows for more uniform intercalation of Na.

Figure 4:
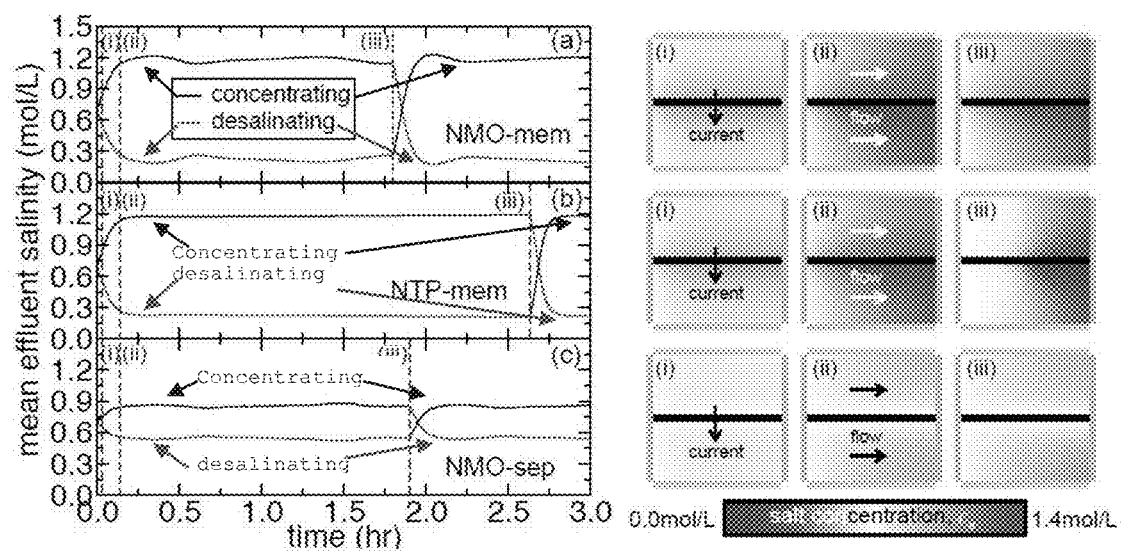
FIGS. 4a-c. Space-averaged outlet salt-concentration in the electrolyte (left) during the charge cycle of a (a) NMO-membrane cell, (b) NTP-membrane cell, and (c) NMO-separator cell. At the indicated instants in time (i-iii) the distribution of NaCl in the electrolyte is shown (right).

Though the NMO-Separator cell shows lowest polarization and highly uniform reactions, these improvements occur with low degree-of-desalination. These results show that a Na-blocking membrane must be used to achieve high degree-of-desalination. FIG. 4 shows the time variation of effluent salt-concentration (or salinity in mol/L) in the concentrated and diluted electrodes. Also, the distribution of salinity inside each electrode is shown at several instants in time. Initially salt concentration decreases uniformly inside each electrode (between snapshot i), but eventually the membrane-based cells in FIGS. 4a,b (using NMO and NTP, respectively) show steady effluent salt-concentrations and exhibit near-theoretical degree of desalination based on charge counting (65%). The Na-blocking membrane enables highly concentrated salt-solution to persist in the outlet of the cell without diffusing across the membrane (FIGS. 4a, b, snapshots ii and iii). In contrast, the NMO-Separator cell (FIG. 4c) shows only 25% degree-of-desalination. The separator-based cell achieves only half the theoretical degree-of-desalination because the separator allows salt to diffuse from the concentrated electrode into the diluted electrode.

The robustness of the results for the exemplary embodiments were confirmed by simulating the sensitivity of desalination performance to the values assumed for the effective electronic conductivity $\sigma_s$ of the porous electrodes and the kinetic rate-constant k for Na intercalation. Table 2 shows that the energy consumed during desalination (with lossless energy recovery) by NTP and NMO cells (using membranes) increases by 2% when electronic conductivity is reduced one order of magnitude from 100 S/m to 10 S/m. Also, electrode-active-material utilization decreases by less than 1% from 100 S/m to 10 S/m. These results indicate that the predictability of the present simulations is not limited by variations in effective electronic-conductivity that could result from electrode processing. Table 3 shows that desalination energy for both cells decreases by 4-9% when the kinetic rate-constant increases by one order of magnitude from the value fitted to experimental polarization. Thus, the present results are indicative of electrode active materials with facile intercalation kinetics. Reducing the rate constant by an order of magnitude produces 43% and 98% higher desalination energy for NMO and NTP cells, respectively. While the NMO cell is able to achieve substantial utilization (74%), the NTP cell does not function effectively with such low rate constants, achieving less than 1% utilization. Thus, facile intercalation kinetics are needed for NID cells to function.

A critical consideration in the design of NID cells is the electrochemical stability window of water, because a stable electrolyte will enable efficient, reversible cycling. Reduction potentials range between 0.35 to 0.80 V vs. SHE inside NMO-Membrane cells and −0.62 to −0.40 V vs. SHE inside NTP-Membrane cells for the cases shown in FIGS. 3 and 4. $O_2$ evolution occurs for neutral pH at potentials higher than 0.81 V vs. SHE, and $H_2$ evolution occurs at potentials less than −0.41 V vs. SHE. Seawater pH is slightly basic, with a pH of about 8.[62] Therefore, $O_2/H_2$ evolution is unlikely to occur during cycling of NMO-based cells when seawater is desalinated. In contrast, NTP-based cells will likely evolve $H_2$ in seawater unless pH exceeds 11.5. Also, previous experiments[34] suggest that NTP decomposition occurs in alkaline solutions with pH>9, and this effect may require use of NTP cells outside of the electrolyte stability-window. The present model does not account for the mechanism of electrode active-material mediated hydrolysis believed to occur with other aqueous electrode active materials,[55] and experimental investigation is needed to assess these effects. Also, the concentration and dilution of salt could induce a shift in pH inside the cell and that effect has not been accounted for presently.

TABLE 2

Desalination energy and utilization on discharge as a function of effective electronic conductivity for the conditions and parameters simulated in FIGS. 3 and 4. The bold line lists the results for the effective electronic conductivity assumed for all subsequent results.

| | NMO-Membrane | | NTP-Membrane | |
| --- | --- | --- | --- | --- |
| $\sigma_s$ S/m | Desalination Energy kWh/m³ | Utilization % | Desalination Energy kWh/m³ | Utilization % |
| 1000 | 1.23 | 80.0 | 1.64 | 69.3 |
| 100 | 1.23 | 79.9 | 1.65 | 69.3 |
| 10 | 1.26 | 79.3 | 1.67 | 69.0 |
| 1 | 1.63 | 73.6 | 1.90 | 62.7 |

Effect of Current Density and Electrode Thickness

When a Na-ion cell with a Na-blocking membrane is used to desalinate water, the rate at which desalination occurs is affected by a variety of parameters. High current densities can be used to desalinate water at high throughput rates by increasing flow rate in proportion to current density. Also, the cost of a Na-ion cell decreases as electrode thickness increases because the fraction of cost from inactive cell components (e.g., membranes and current collectors) is reduced with cells having thick electrodes. Therefore, certain current densities and electrode thicknesses enable lower-cost, more efficient desalination devices.

TABLE 3

Desalination energy and utilization on discharge as a function of kinetic rate-constant for the conditions and parameters simulated in FIGS. 3 and 4. The bold line lists the results for the rate constants assumed for all subsequent results.

| NMO-Membrane | | | NTP-Membrane | | |
| --- | --- | --- | --- | --- | --- |
| Rate Constant mol/m²-s per (mol/m³)$^{1.5}$ | Desalination Energy kWh/m³ | Utilization % | Rate Constant mol/m²-s per (mol/m³)$^{1.5}$ | Desalination Energy kWh/m³ | Utilization % |
| $2.12 \times 10^{-10}$ | 1.18 | 81.1 | $6.31 \times 10^{-14}$ | 1.50 | 71.0 |
| $2.12 \times 10^{-11}$ | 1.23 | 79.9 | $6.31 \times 10^{-13}$ | 1.65 | 69.3 |
| $2.12 \times 10^{-12}$ | 1.76 | 70.8 | $6.31 \times 10^{-12}$ | 3.11 | 0.001 |

Figure 2:
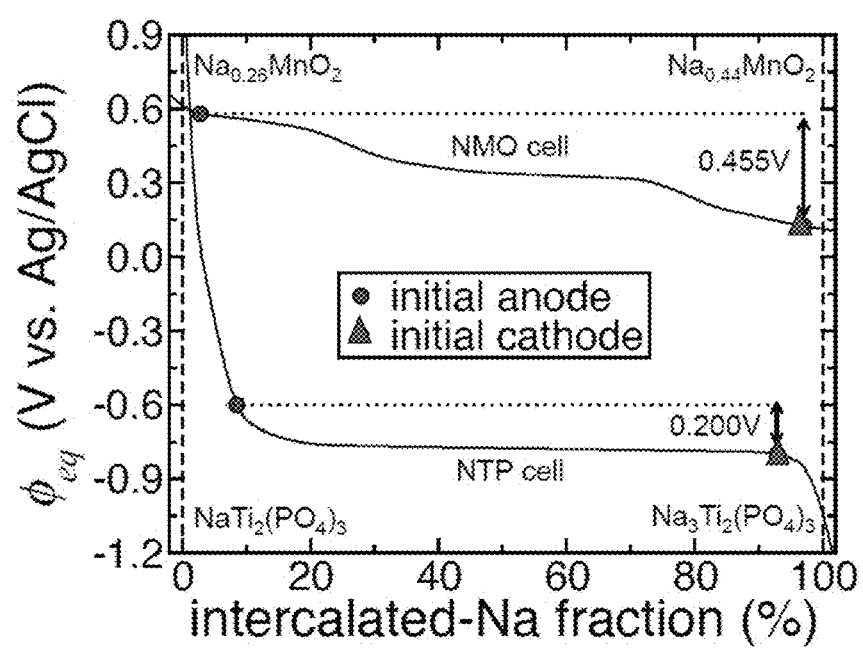
FIG. 2. NMO and NTP equilibrium potentials used in the present simulations. These curves were extrapolated from absolute potentials measured experimentally during charge and discharge of an NTP/NMO cell at 0.6 C in Ref. 38. Data points show the conditions that electrodes in NTP and NMO cells were initialized within all simulations.
Figure 5:
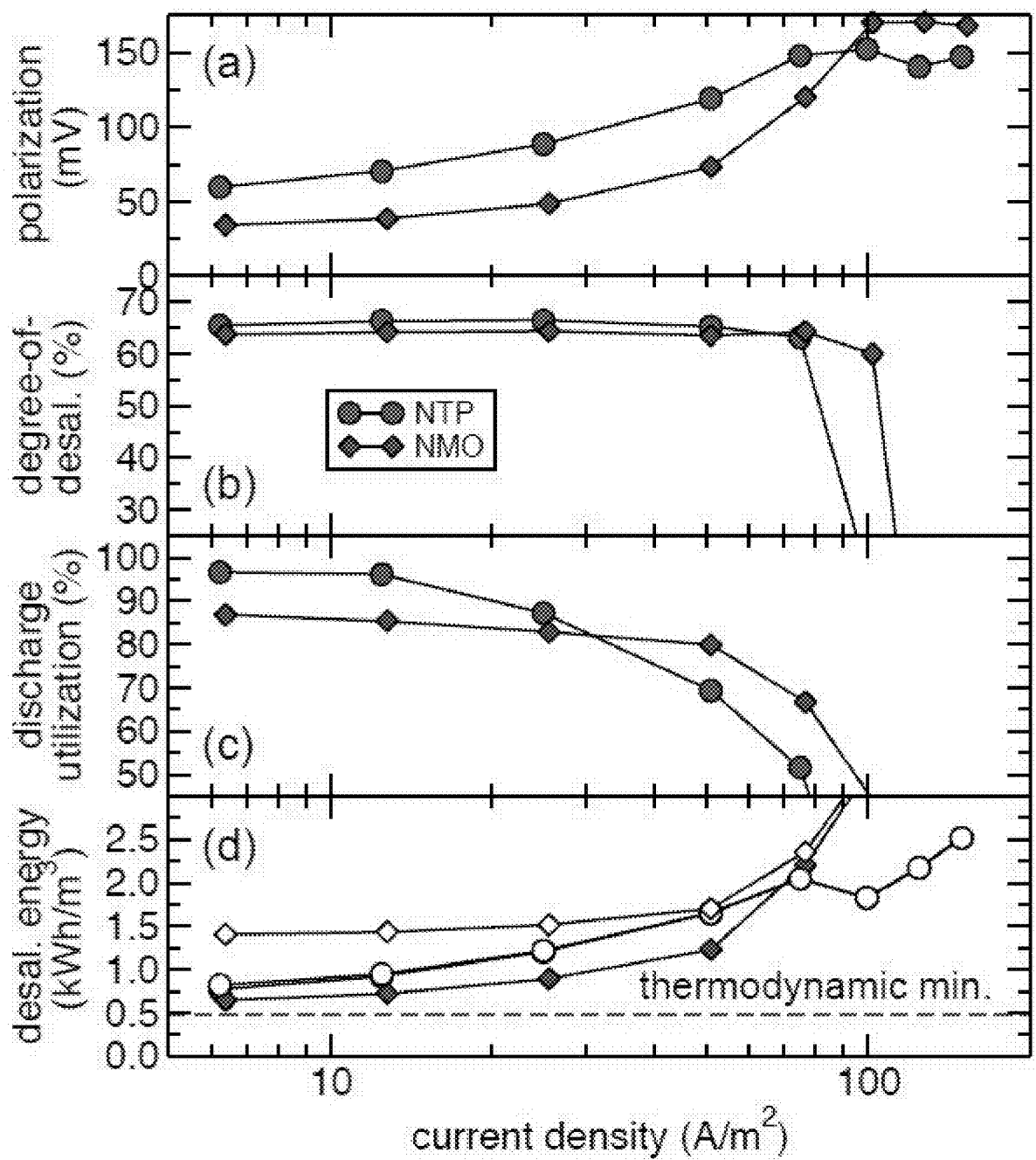
FIGS. 5a-d. Desalination performance as a function of current density for NMO and NTP cells that use Na-blocking membranes. From top to bottom: (a) time-averaged polarization, (b) degree-of-desalination on discharge, (c) discharge utilization, and (d) desalination energy on discharge. The dashed line indicates thermodynamic minimum energy. Filled and white symbols represent 100% and 0% energy recovery, respectively.

First the effect of applied current-density on desalination performance was investigated (FIGS. 5a-d). Among the different current densities tested, the water flow-rate was varied in proportion with current density, so as to maintain the same theoretical degree-of-desalination expected from Faraday's Law. For influent seawater with 700 mM NaCl, the present cases are expected to achieve 224 mM salinity in the depleted stream (68% degree-of-desalination). For both NTP and NMO cells, current densities below 77 A/m$^2$ produce salinity levels less than 260 mM on average in the depleted stream (63% degree-of-desalination), which is near the 68% theoretical degree-of-desalination (FIG. 5b). For the lowest current density simulated (5 A/m$^2$) the desalination energy needed with lossless energy recovery exceeds the thermodynamic minimum (0.49 kWh/m$^3$, see Ref. 83) by 32% for NMO and 58% for NTP. While energy recovery has negligible impact on NTP cells (due to the large range of intercalation over which equilibrium potential is constant as shown in FIG. 2), NMO cells cycled at low current density require twice as much energy when energy recovery is not utilized. The utilization of electrode active-material charge-capacity decreases with increasing current density (FIG. 5c). At high current densities polarization (FIG. 5a) causes cell voltage to reach the pre-specified voltage cutoff value earlier in both the charge and discharge processes. When this occurs, a smaller amount of water is desalinated during a complete cycle and is manifested as decreased utilization (less than 50%) at current densities higher than 77 A/m$^2$. Also, the desalination energy (in kWh/m$^3$, FIG. 5d) varies dramatically for current densities in this range: 0.7-0.9 kWh/m$^3$ is needed to desalinate at 13 A/m$^2$, while 2.0-2.2 kWh/m$^3$ is needed to desalinate at 77 A/m$^2$. High current densities enable rapid production of desalinated water (since flow velocity is proportional to the current density), but the energy required to produce it may dictate use of lower current densities. Also, NTP cells show higher polarization than NMO cells at the same current density, which is consistent with the results in FIGS. 3 and 4. NTP cells show higher kinetic polarization due to its lower kinetic rate-constant compared to NMO (6.31×10$^{-13}$ versus 2.12×10$^{-11}$ mol/m$^2$-s per (mol/m$^3$)$^{1.5}$).

Figure 6:
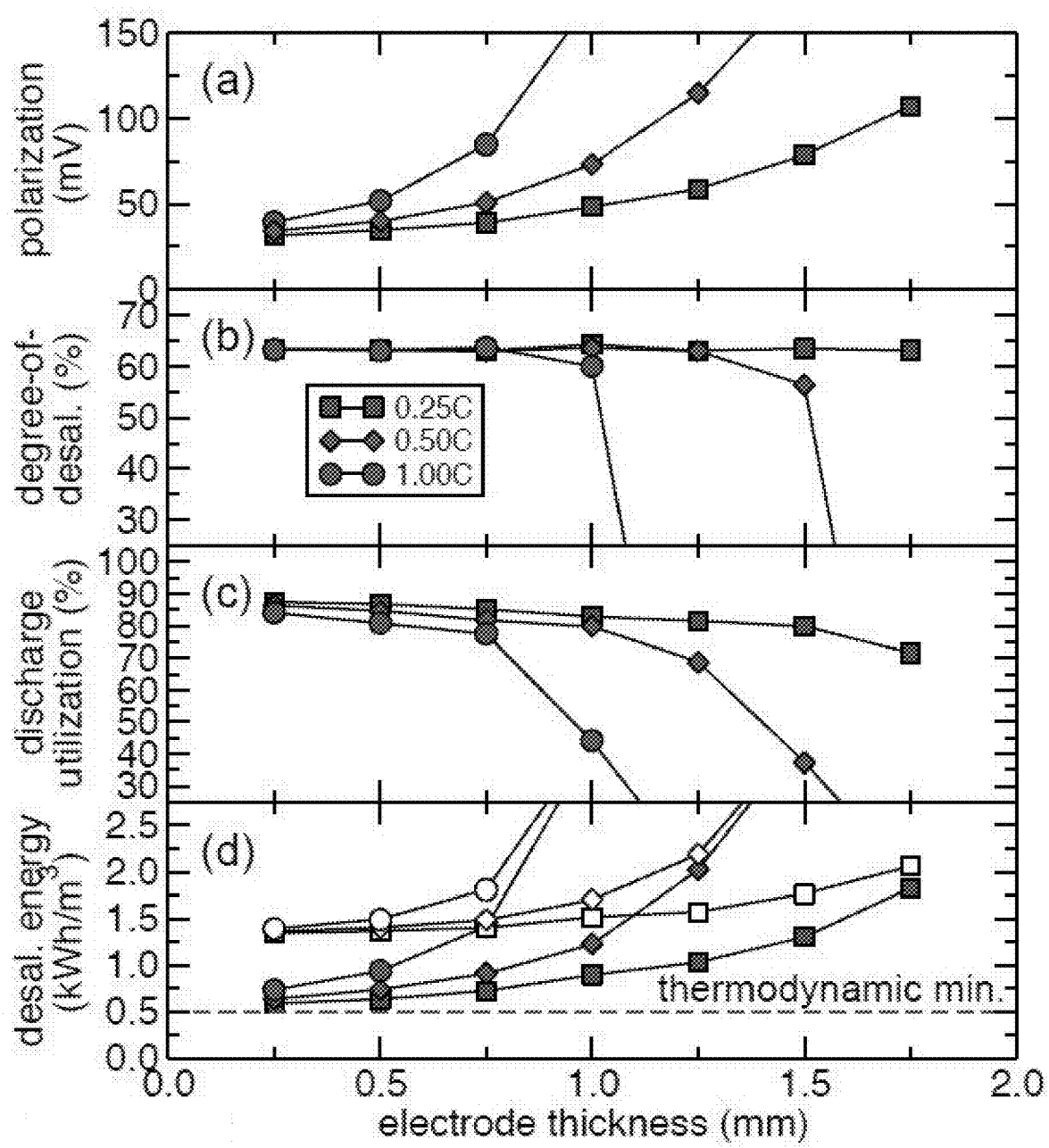
FIGS. 6a-d. Desalination performance as a function of electrode thickness for the NMO-membrane cell for C/4, C/2, and 1 C rates. From top to bottom: (a) time-averaged polarization, (b) degree-of-desalination on discharge, (c) discharge utilization, and (d) desalination energy on discharge. The dashed line indicates thermodynamic minimum energy. Filled and white symbols represent 100% and 0% energy recovery, respectively.

As mentioned previously, electrode thickness will affect the cost of an NID cell. Therefore, it is desirable to understand how design changes to this dimension will affect cell performance. When the C-rate is held constant among different electrode thicknesses, the theoretical time-scale for charge and discharge is held constant among all cases. FIG. 6 shows the desalination performance for various electrode thicknesses simulated at 0.25 C, 0.50 C, and 1.00 C rate (corresponding to theoretical charge times of 4 hr, 2 hr, and 1 hr, respectively). In addition the pore-scale mean-velocities were set to 28 μm/s, 56 μm/s and 111 μm/s for 0.25 C, 0.50 C, and 1.00 C, so as to achieve 68% theoretical degree-of-desalination in all cases.

For a given C-rate, cell polarization increases quadratically with electrode thickness (FIG. 6a) due to the dominant role of ohmic drop through the electrolyte, limiting the degree-of-desalination, utilization, and efficiency of thick electrodes (FIGS. 6b-d). At 0.25 C, 0.50 C, and 1.00 C, thicknesses of 0.75 mm, 1.25 mm, and 1.75 mm (respectively) operate with 70% utilization and 60% degree-of-desalination, but require three times the minimum desalination-energy expected from thermodynamics even with lossless energy-recovery. In contrast, thicknesses of 250 μm, 500 μm, and 750 μm can desalinate within 50% of the thermodynamic minimum (72-74 kWh/m$^3$) when cycled at 0.25 C, 0.50 C, and 1.00 C with lossless energy-recovery, respectively.

Effect of Influent Salinity and Water Recovery

The specific application for which a desalination device is used dictates the salt concentration of the influent and the amount of effluent concentrate that is tolerable. Therefore, the desalination performance that can be achieved when using water sources with influent salinity ranges from levels of typical brackish water (70 mM) up to those of typical seawater (700 mM). Though moderate levels of water recovery are acceptable when potable water is processed from abundant sources, higher water-recovery is required where influent feed-water is scarce. Accordingly, Na-ion cells can achieve high water-recovery by simulating desalination performance for 50-95% water-recovery levels.

Figure 7:
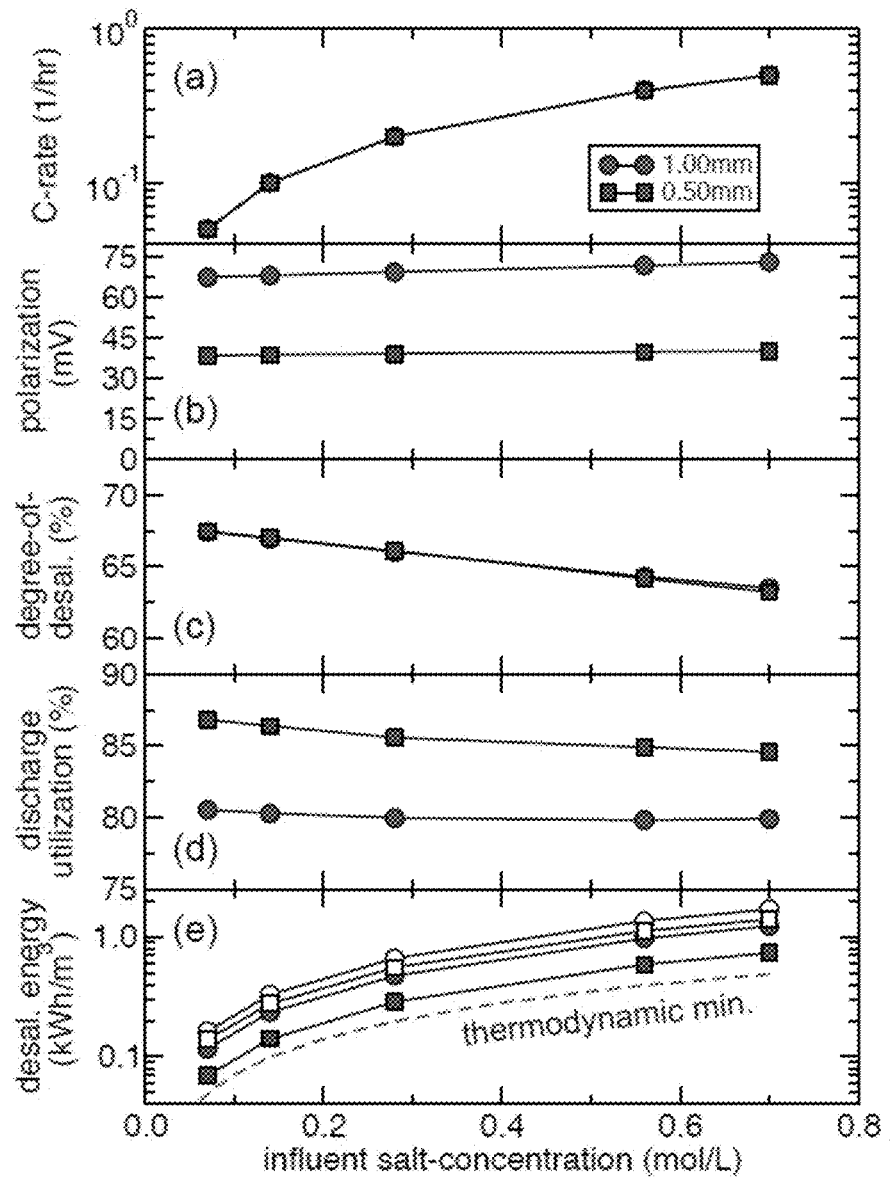
FIGS. 7a-e. Desalination performance as a function of influent concentration for the NMO-membrane cell for 1.00 mm- and 0.50 mm-thick electrodes. From top to bottom: (a) choice of C-rate, (b) time-averaged polarization, (c) degree-of-desalination on discharge, (d) discharge utilization, and (e) desalination energy on discharge. Filled and white symbols represent 100% and 0% energy recovery, respectively.

FIG. 7 shows desalination performance as a function of influent salt-concentration. In each cell, C-rate was reduced in proportion with influent salt-concentration (FIG. 7a) because brackish water has lower ionic conductivity than seawater and, consequently, cells operating with brackish influent will have lower rate capability than those operating with seawater. Among the influent concentrations simulated, influent velocity was varied so as to achieve 68% theoretical degree-of-desalination. Both 1.00 mm- and 0.50 mm-thick electrodes were simulated at each influent concentration. For a given thickness, polarization, degree-of-desalination, and electrode-active-material utilization varied by less than 5 mV, 5%, and 1%, respectively, among the different influent concentrations (FIGS. 7b-d). While the aforementioned performance metrics are invariant with influent salinity, desalination energy decreases as influent concentration decreases (FIG. 7e) because the amount of charge-transfer (in coulombs per m$^3$) required to achieve a certain degree-of-desalination decreases with influent salinity. For 1.00 mm-thick electrodes desalination energy was 2.5 times the thermodynamic minimum-energy with lossless energy-recovery (FIG. 7e), but desalination energy decreases to within 40% of the thermodynamic minimum for 0.50 mm-thick electrodes (FIG. 7e).

Figure 8:
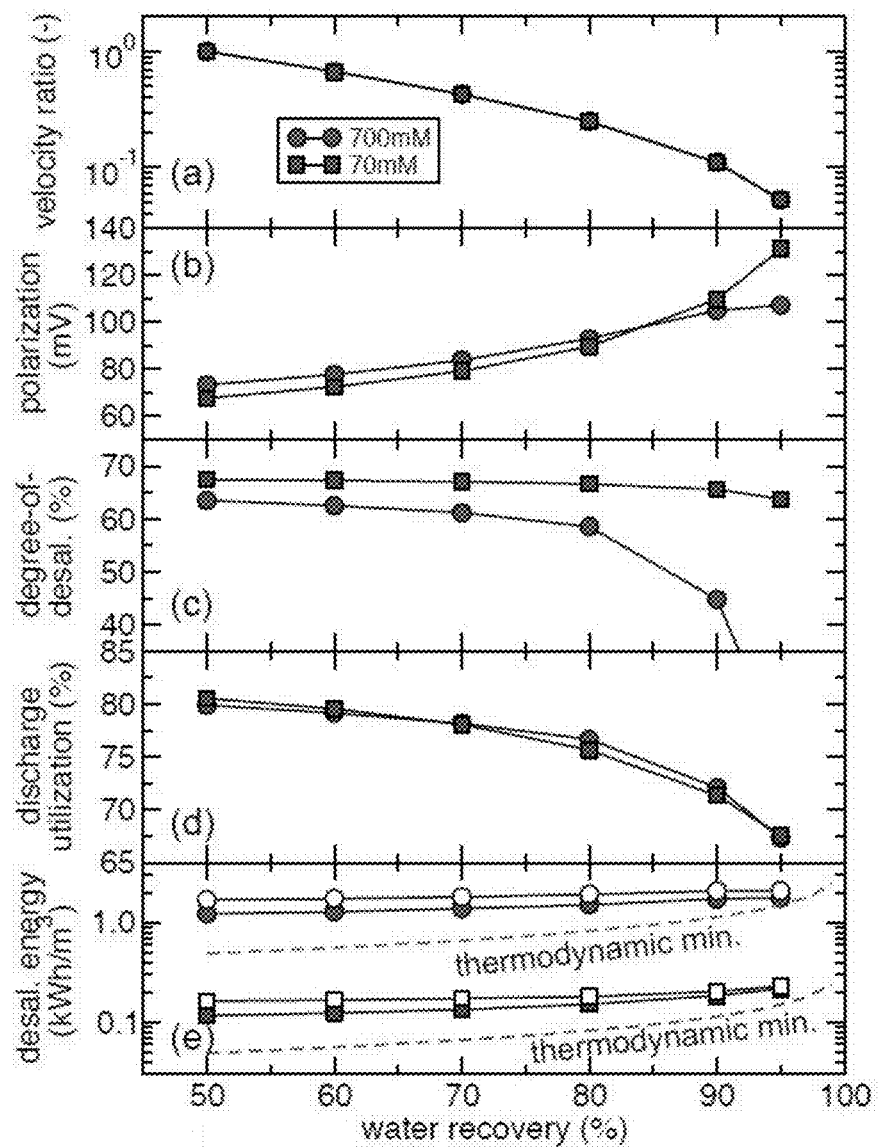
FIGS. 8a-e. Desalination performance as a function of water recovery for the NMO-membrane cell with 700 mM-influent cycled at C/2 and 70 mM-NaCl cycled at C/20. Data are shown for two cycling scenarios where the cell was cycled with and without influent purging between charge and discharge. From top to bottom: (a) ratio of concentrating- and desalinating-electrode velocities, (b) time-averaged polarization, (c) degree-of-desalination on discharge, (d) discharge utilization, and (e) desalination energy on discharge. Filled and white symbols represent 100% and 0% energy recovery, respectively.

Water recovery r is defined as the fraction of desalinated water-volume relative to influent water-volume. The symmetric cells simulated here are designed with equal cathode and anode electrode thicknesses (i.e., $w_a = w_c$). Therefore, water recovery r increases as superficial velocity $u_{s,d}$ in the depleting electrode (anode on charge, cathode on discharge) increases and as superficial velocity $u_{s,a}$ in the accumulating electrode (cathode on charge, anode on discharge) decreases, according to the following relationship $r = u_{s,d}/(u_{s,d} + u_{s,a})$. To adjust water recovery the superficial velocity in the accumulating electrode is reduced and the superficial velocity in the depleting electrode is kept constant (FIG. 8a). When charging stops and discharging starts, the direction of current is switched. Consequently, superficial velocities in the respective electrodes are swapped. In an experimental device, appropriate plumbing will be required to achieve these flow conditions. Cell performance is shown in FIGS. 8a-d as a function of water recovery for 700 mM and 70 mM influent concentrations. For both influents, polarization and desalination energy (FIGS. 8b,d) increase mildly with water recovery due to the increase in Donnan potential resulting from the high salt-concentrations produced at high water recovery. The desalination energy with lossless energy-recovery for high water-recovery levels exceeds the thermodynamic minimum by a lesser amount (84%) than with 50% water-recovery.

Figure 9:
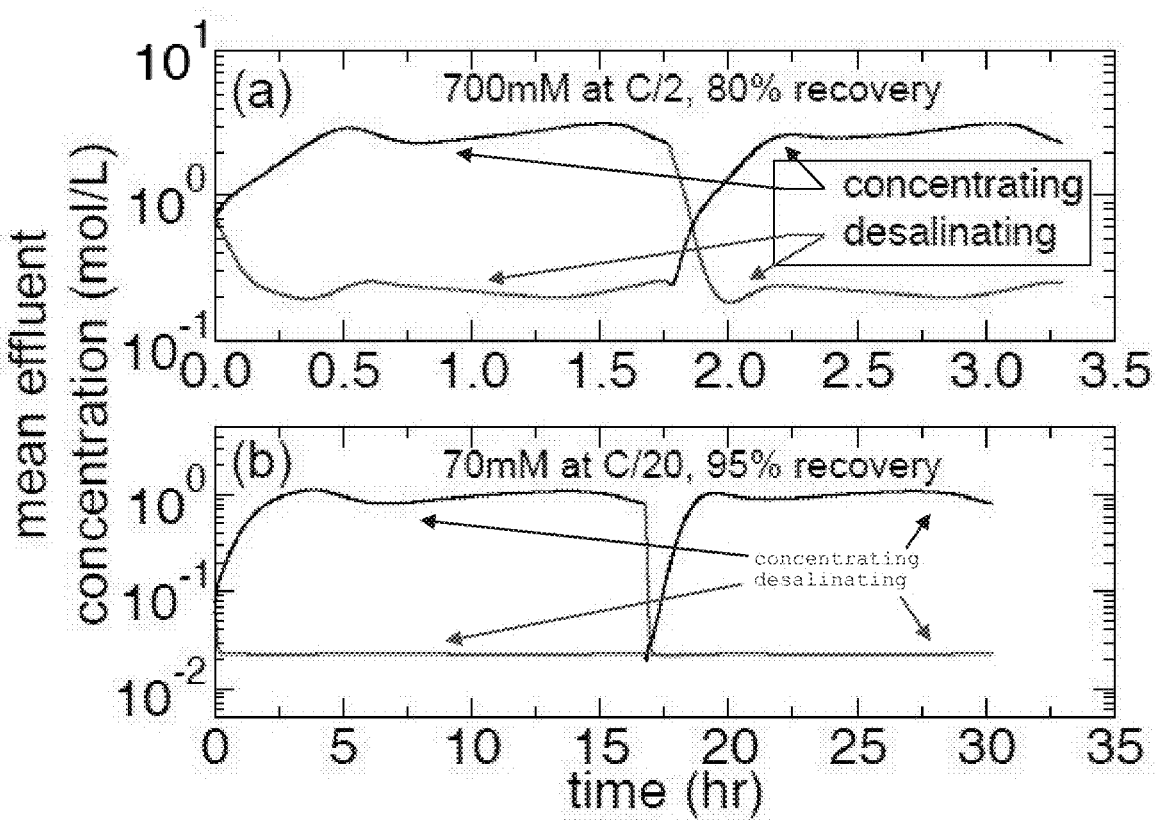
FIGS. 9a-b. Mean effluent concentration as a function of time for the NMO-membrane cell with (a) 700 mM-NaCl influent cycled at C/2 with 80% water recovery and (b) 70 mM-NaCl influent cycled at C/20 with 95% water recovery.

With 700 mM influent the degree-of-desalination decreased from 65% to 30% between water-recovery levels of 80% and 95% (FIG. 8c). This effect results from the discharge process beginning with residual concentrated solution from the charge process. This effect is illustrated in FIG. 9a, which shows the variation of effluent concentration with time for 700 mM influent with 80% water recovery. Immediately following completion of the charge process (1.75 hr), the discharge process commences with an effluent concentration (2 mol/L) far in excess of the inlet concentration (0.7 mol/L). Desalination of residual NaCl delays production of desalinated effluent with the target concentration (224 mM) by 30 minutes, which constitutes a substantial fraction of the entire discharge process (1.5 hours). For higher water-recovery levels this effect becomes more significant. In addition effluent concentrations in excess of the NaCl solubility limit were predicted at 90% water-recovery. For lower levels of water recovery the degree-of-desalination can be enhanced by purging the cell with fresh effluent immediately following a charge or discharge step.

In contrast in FIG. 9b, cells cycled with 70 mM influent sustained degree-of-desalination levels of greater than 64% for water recovery levels as high as 95%. The transient effluent-concentration in 70 mM cells exhibits similar effects due to residual NaCl that are similar to those in 700 mM cells, but the time delay to production of target concentrations is very short (30 min) relative to the total discharge time (15 hr). Furthermore, the maximum effluent-concentration reached during the entire charge/discharge process at 95% water recovery (~1 mol/L) was below the NaCl solubility limit. Thus, high water recovery levels are possible for NID devices using 70 mM influent.

Na-Ion Desalination Electrodialysis Stack

Figure 10:
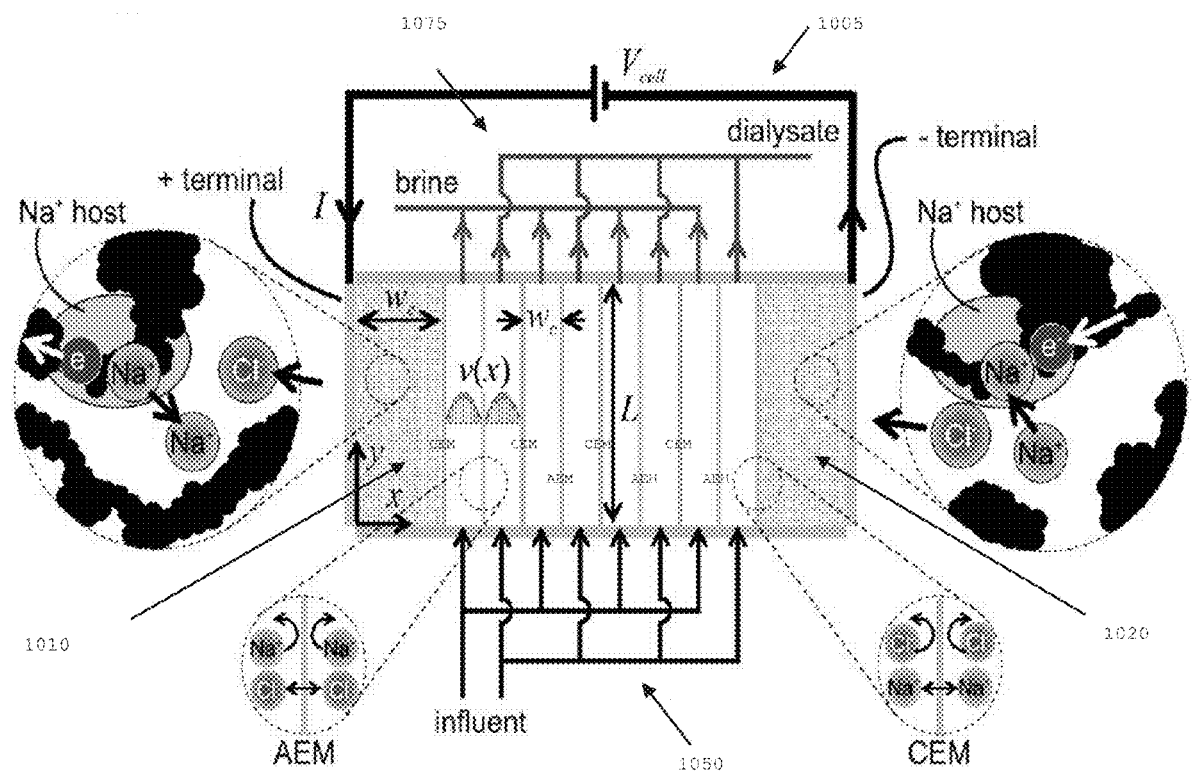
FIG. 10: Schematic of a simulated electrodialysis stack utilizing Na-ion intercalation electrodes.

FIG. 10 depicts a second aspect of the exemplary embodiments, a NID electrodialysis stack 1000. The stack 1000 is designed with a streamwise length L of 20 mm, porous electrodes 1010, 1020 with thickness $w_e$ of 1.0 mm, and infinitesimally thick ion-exchange membranes (IEMs) spaced at a channel thickness $w_e$ of 0.4 mm. Within the cell 1000 an alternating series of cation-exchange membranes (CEMs) and anion-exchange membranes (AEMs) are used to induce production of concentrated brine and desalinated dialysate from influent saline water flowed with a steady, fully developed crossplane velocity v(x), which depends only on thru-plane position x. A cell voltage $V_{cell}$ is measured between the stack's positive and negative terminals as a constant total current I is applied to the positive terminal via circuit 1005. Feed stream lines 1050 are used as a supply and outlet lines 1075 receive the discharge which is alternating between brine and dialysate.

A porous-electrode, such as used in the NID device described in the exemplary embodiments, is used for ionic conduction, salt diffusion, membrane polarization and transport, intercalation reactions, and electronic conduction within NID electrodialysis stacks. Ionic conduction and salt diffusion are enhanced by incorporating concentrated solution effects for aqueous NaCl, and implementing membrane with generic cation transference numbers.

In one example, $Na_{0.44}MnO_2$ (NMO) was used as a Na-ion intercalation compound in the electrodialysis stack with the material-specific parameters described previously, though a variety of Na-ion intercalation compounds exist that could be employed in the NID electrodialysis stack. The porous electrodes employed in this example include 50 vol. % NMO and 40 vol. % porosity.

Several cells using Na-ion intercalation compounds were used to evaluate scale-up of NID cells to large NID electrodialysis stacks. In each case common dimensions were used for the design of the cell (1.0 mm electrode thickness, 0.4 mm membrane spacing, 20 mm channel length) and each cell was charged and discharged at 51 A/m² average current density. The composition of the electrodes employed was fixed to 50 vol. % NMO and 40 vol. % porosity. NID cells can be operated in a mode where saline solution flows through porous electrodes, but the flow-through design poses challenges to the mechanical design of NID cells, because of the low fluidic permeability of cast electrodes with small pores (~10 microns). Alternatively, a flow-by configuration can be employed where saline water flows in open channels instead of through porous electrodes. Flow-by configurations have been employed readily in capacitive deionization (CDI) cells and in flow batteries. In the context of CDI such configurations have been shown to produce low coulombic efficiency and salt removal. Accordingly, membrane based CDI (MCDI) has been developed with ion exchange membranes arranged between electrodes and flow channels to prevent leakage of salt into and out of capacitive electrode compartments.

Figure 11:
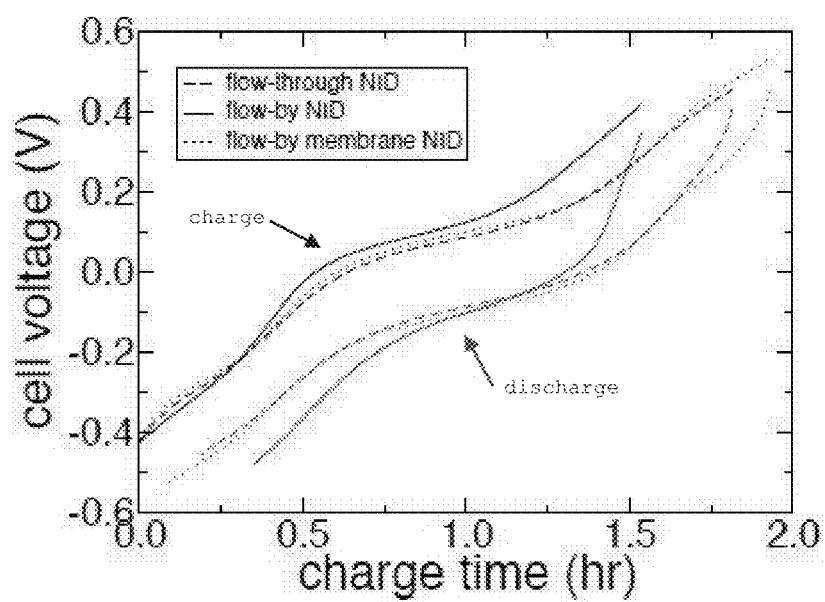
FIG. 11: Cell voltage as a function of time is shown for both charge (black curves) and discharge steps (red curves) of the first cycle for flow through, flow by, and membrane-protected cells.
Figure 12:
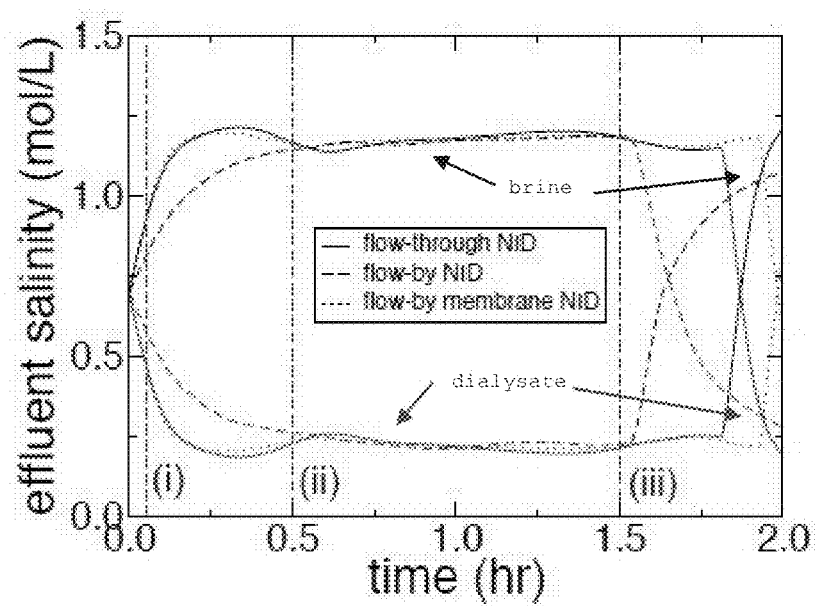
FIG. 12: Effluent salinity as a function of time is shown for both brine (black curves) and dialysate (red curves) during the first cycle for flow through, flow by, and membrane-protected cells.

Because Na-ion intercalation compounds are used in both electrodes, cation exchange membranes (CEMs) were used in the membrane flow-by NID configuration. FIG. 11 shows the variation of cell voltage as a function of charge time (i.e., negative time corresponds to discharge) for the first charge/discharge cycle of these three NID cells. Membrane flow-by NID shows improved capacity and similar polarization to flow-through NID, despite its larger thru-plane thickness of the flow-by NID. In contrast, when flow-by NID is used without CEMs lesser capacity is obtained and more polarization is incurred than with CEMs. FIG. 12 shows effluent salinity for these cells as well. All three cells eventually produce effluent near theoretical levels, but flow-by NID requires nearly three-fold longer time to reach the desired effluent salinity than flow-through NID and membrane flow-by NID.

Figure 13:
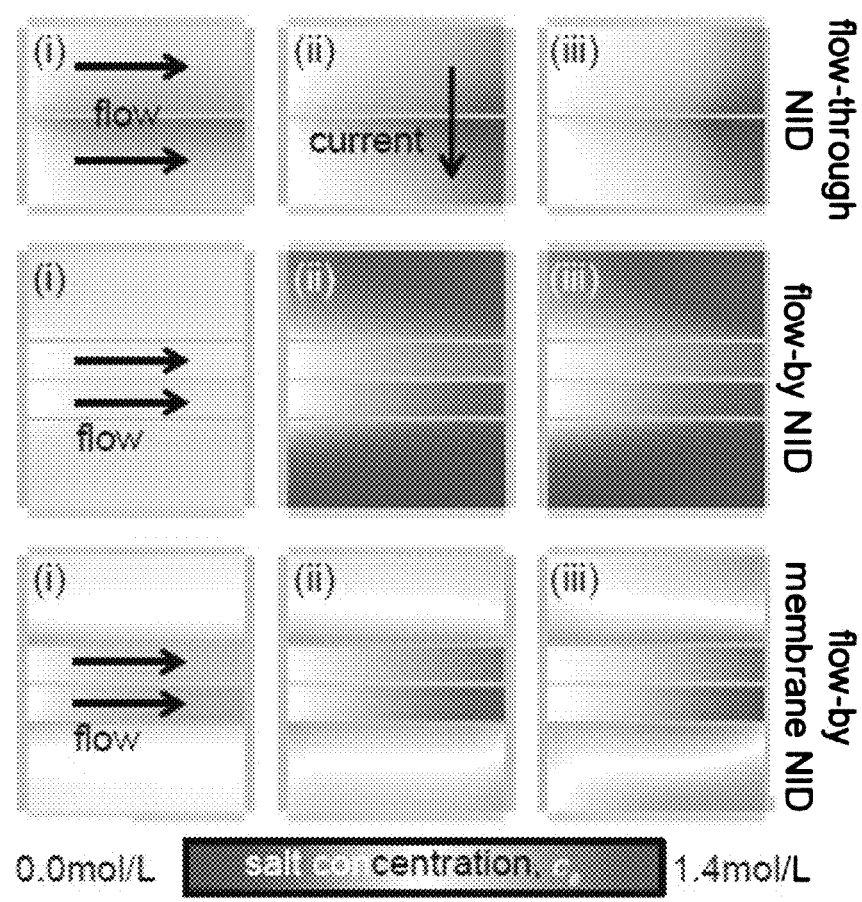
FIG. 13: Snapshots of salt concentration for three instants in time marked in FIG. 12 for flow through, flow by, and membrane-protected cells.

The aforementioned results reveal that membrane flow-by NID is preferable to flow-by NID. The reason that membrane flow-by NID performs better is due to its ability to retain salt within its Na-ion electrodes. This phenomenon is revealed in FIG. 13, which shows snapshots of salt concentration within each cell at several instants during charging. Though after 30 minutes of charging flow-by NID achieves theoretical desalination levels within its effluent, salt concentration within the positive electrode decreases to the same level due to salt diffusion at the electrode/flow-channel interface. While salt concentration within the electrodes of the flowby membrane NID cell is non-uniform due to concentration polarization at the CEM, but on average it remains at the initial salinity level.

Flow-by membrane NID exhibits several benefits over the other two architectures including its flowability, high capacity, and low polarization. The structure of alternating membranes within the flow-by membrane NID cell (CEM-AEM-CEM) is similar to that found in electrodialysis (ED) cells, but differs from ED cells in that NID cells contain two flow passages while ED cells can theoretically employ any multiple of two channels.

Figure 14:
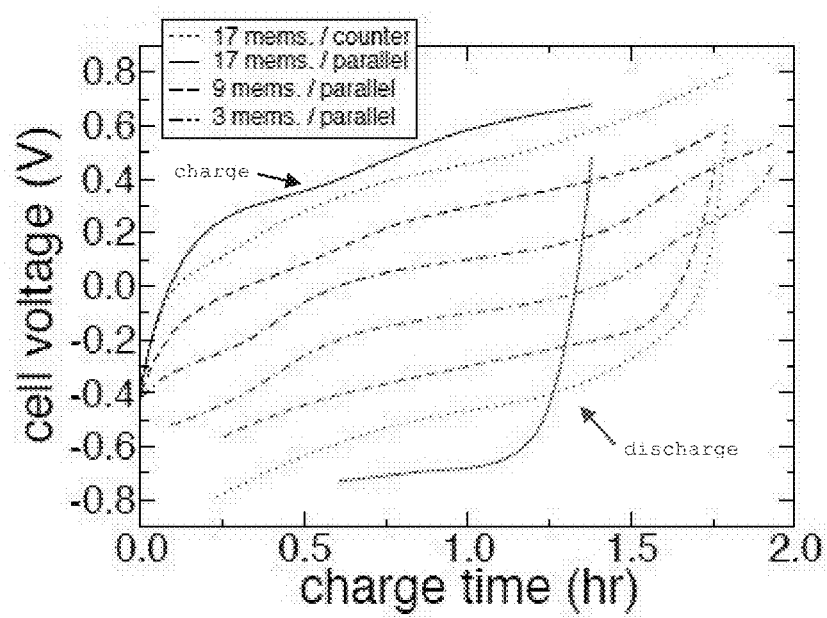
FIG. 14: Cell voltage as a function of time is shown for both charge (top four black curves) and discharge steps (bottom four red curves) of the first cycle for NID electrodialysis stacks with 9 membranes and parallel flow, 17 membranes and parallel flow, and 17 membranes and counterflow.

More flow channels can also be added to an NID cell to create an ED stack that uses Na-ion intercalation electrodes. Shown in FIG. 14 are the cycling characteristics of NID ED stacks with 9 membranes comprising 8 flow channels and 17 membranes comprising 16 flow channels. In addition, two different embodiments were evaluated in which different flow scenarios were used: (1) parallel flow where influent in adjacent channels flows in the same direction and (2)

counterflow where influent flows in opposing directions. The voltage curves for these stacks, demonstrate that average polarization increases as the number of membranes (or, equivalently, flow channels) increases. This effect is due to the additive nature of the Donnan potentials that act at solution/membrane interfaces. Since cycling is terminated based on a limit for the local state-of-charge, the 9-membrane cell in parallel flow and the 17-membrane cell in counterflow achieve utilization in excess of 80%, in spite of their increased polarization relative to the 3-membrane cell. In contrast, the 17-membrane cell in parallel flow attains only ~40% utilization.

Figure 16:
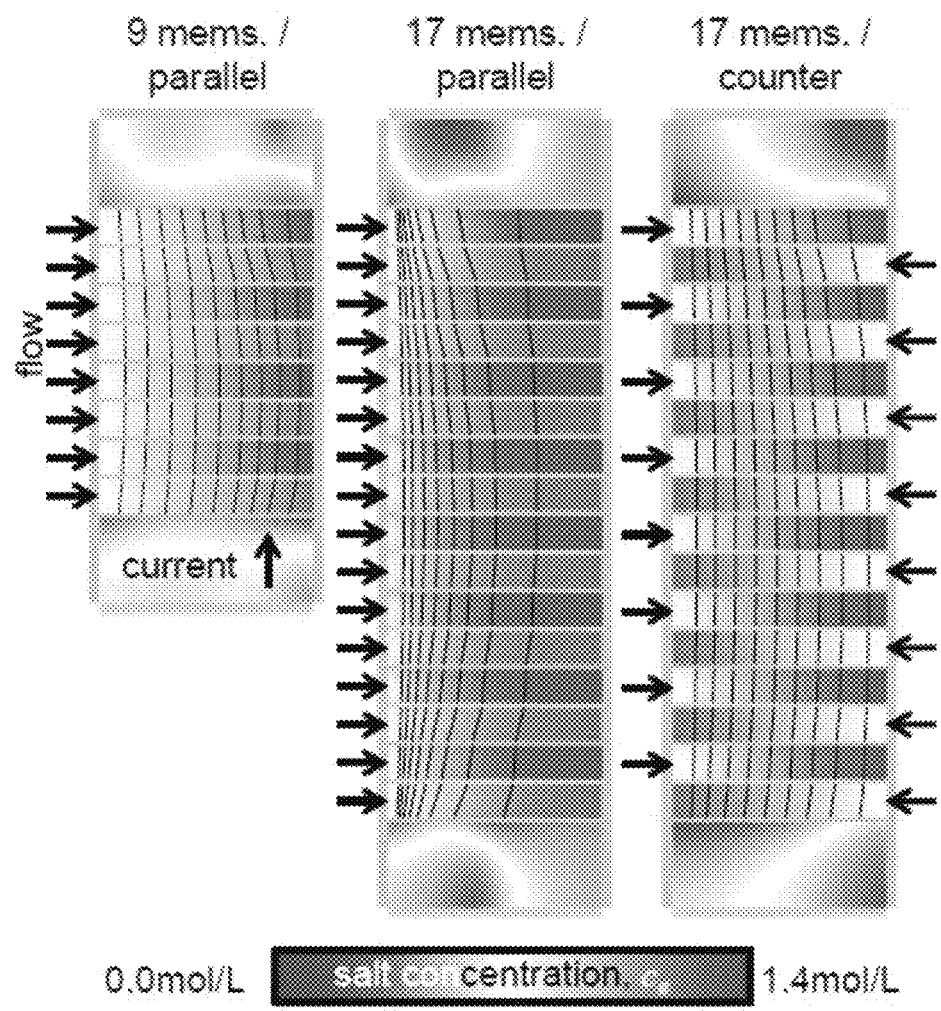
FIG. 16: Snapshots of salt concentration at the end of discharge are shown for each cell. Solution-phase current-density lines within the flow channels are overlaid as black lines on each distribution.

The observed capacity variations are resultant from the solution-phase current and salt concentration distribution within each stack. FIG. 16 shows salt concentration at the end of discharge and the lines along which ionic current flows within the electrolyte in the flow channels. Current-density lines (similar to heat-flux lines or adiabats in heat transfer) can be understood alternatively as surfaces through which no current flows. Further, the position of these current-density lines has been chosen here such that 10% of the total current flows within the solution between adjacent lines. For the 9-membrane, parallel-flow cell these lines are evenly spaced and are relatively straight, revealing that ionic current flows uniformly across each of the membranes and flows along the shortest path from the positive to the negative electrode. When the number of flow channels is doubled to 16 by using 17 membranes, the current distribution in parallel flow becomes focused at the inlet of the flow channels where current-density lines are grouped closely. The high current density at the inlet is responsible for the higher polarization and lower capacity produced by this stack and is due to the non-uniform membrane polarization that occurs in parallel flow. In contrast, when a counterflow arrangement is used uniform current distribution is produced even with 17 membranes; here, uniform current density is enabled by counterflow's enhanced uniformity of membrane polarization. Despite the variations in capacity and polarization and the nonuniformity of current density, each of these cells produce effluent near the theoretical salinity levels.

Figure 15:
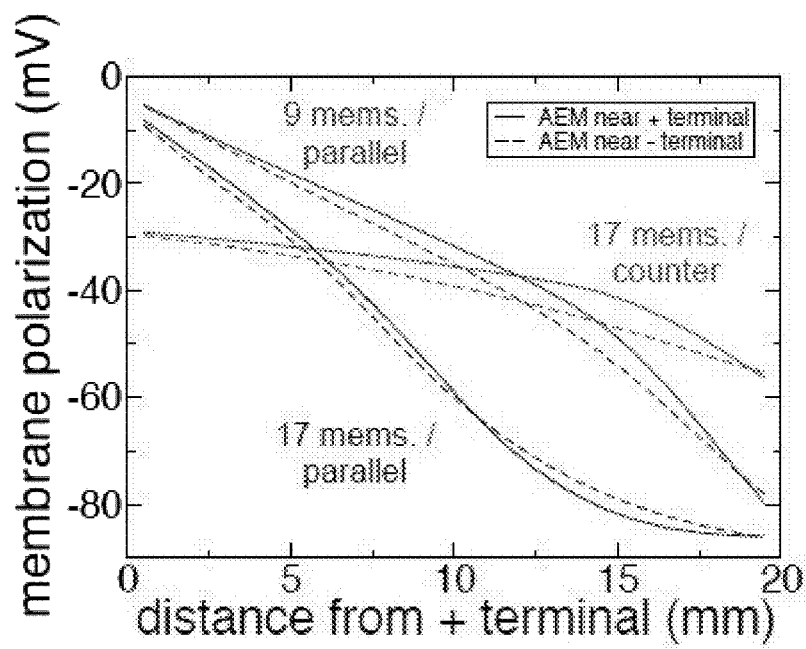
FIG. 15: Membrane polarization profiles for the three stacks of interest at the end of discharge for NID electrodialysis stacks with 9 membranes and parallel flow, 17 membranes and parallel flow, and 17 membranes and counterflow.

The primary reason for non-uniform current distribution is the highly non-uniform membrane polarization experienced in parallel flow. FIG. 15 shows the membrane polarization of two AEMs within the stacks arrangements of interest. The difference in membrane polarization across parallel flow configurations spans approximately 80 mV, while in counterflow the difference in membrane polarization is approximately 20 mV.

Figure 17:
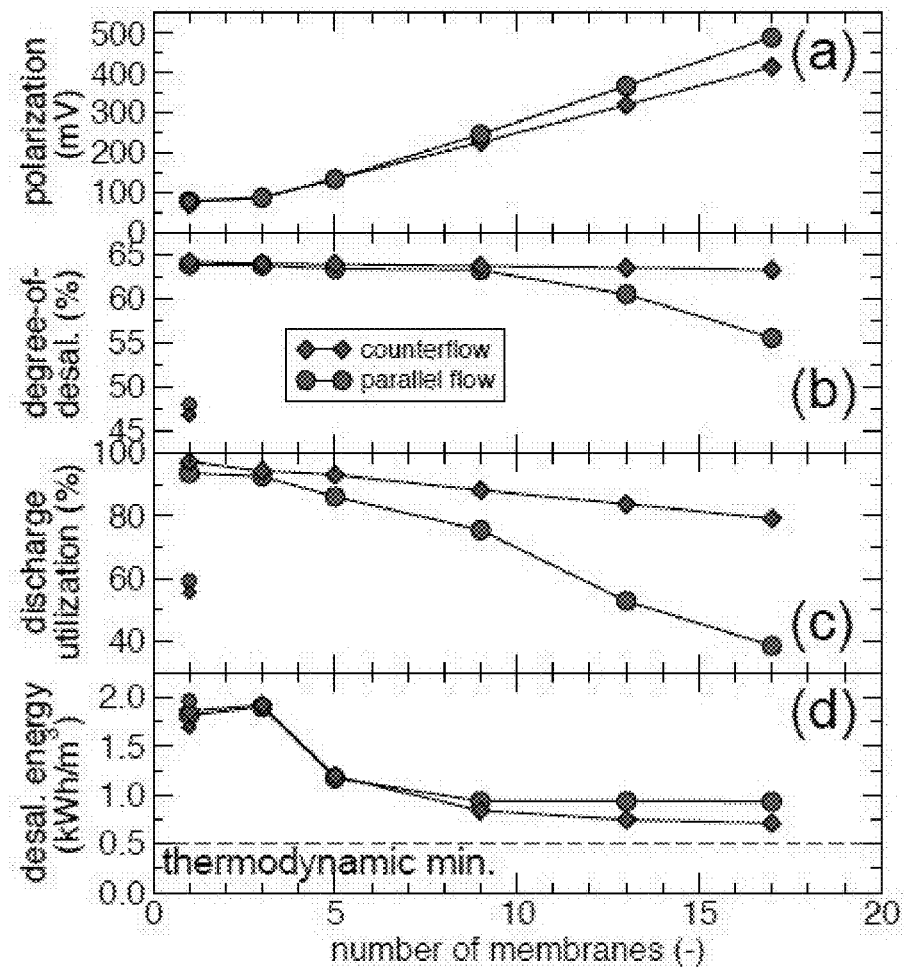
FIGS. 17a-d: Simulated performance as a function of number of membranes. (a) Average polarization, (b) degree-of-desalination, (c) discharge utilization, and (d) desalination energy are shown for the discharge step of the first cycling. For cells with one membrane, data for flow-by NID (without membrane-protected electrodes) is shown separately with small symbols, while flow-through NID is plotted as part of the continuum of NID electrodialysis stacks with large symbols.

The desalination performance metrics for NID electrodialysis stacks are shown in FIG. 17. FIG. 17a shows that average polarization increases linearly with the number of membranes employed, due to the combined effects of membrane polarization and flow-channel resistance. The degree-of-desalination (or salt removal) is shown in FIG. 17b. While counterflow shows sustained degree-of-desalination for all stacks tested, parallel flow exhibits reduced degree-of-desalination for large stacks due to their non-uniform current distributions (see FIG. 16). Parallel flow also shows a precipitous drop in utilization as cell size increases, while counterflow exhibits utilization in excess of 80% even for large cells (FIG. 17c). Finally, desalination energy was computed as energy consumed (assuming no energy recovery during charge/discharge) per unit volume of desalinated water (FIG. 17d). Desalination energy decreases with increasing stack size, approaching within 40% of the thermodynamic minimum. This decreasing trend occurs because ohmic and kinetic energy losses within the electrodes are distributed over a larger volume of product effluent for large cells.

NID Electrodialysis using Prussian Blue Analogues

In another example, nickel hexacyanoferrate (NiHCF) was used in an electrodialysis stack. Ionic conduction and salt diffusion were further enhanced by incorporating concentrated-solution effects for aqueous NaCl, and implementing IEMs with generic cation transference numbers.

The current-conservation equation for aqueous NaCl solution including the so-called thermodynamic factor $\gamma_\pm$ accounting for concentrated solution activity is:[70]

$$\nabla \cdot \left(-\kappa_{\mathit{eff}}\left(\nabla \phi_e - \frac{2R_gT}{F}(1-t_+)\gamma_\pm \nabla \ln c_e\right)\right) - av_s i_n = 0, \quad (1)$$

where $\phi_e$, $c_e$, and $t_+$ are respectively solution-phase potential, salt concentration, and the transference number of cations in solution, and $R_gT/F$ takes its usual meaning. Ionic current density within the electrolyte appears as the argument of the divergence operator in Eq. 1, $\vec{i}_e = -\kappa_{\mathit{eff}}(\nabla \phi_e - 2R_gT/F(1-t_+)\gamma_\pm \nabla \ln c_e)$. The source term couples the intercalation current density $i_n$ (given by reaction kinetics as described previously) of intercalation host particles loaded at volume fraction $v_s$ to ionic current density in solution $\vec{i}_e$, where a is the volumetric surface area of intercalation host particles. Experimental data[71] for the mean-molar activity coefficient $f_\pm$ as a function of $c_e$ was used to compute $\gamma_\pm$ as $\gamma_\pm = (1+\partial \ln f_\pm / \partial \ln c_e)$.[70] The effective ionic conductivity $\kappa_{\mathit{eff}}$ is approximated by Bruggeman theory in terms of the bulk solution-phase ionic conductivity $\kappa$ as $\kappa_{\mathit{eff}} = \varepsilon^{1.5}\kappa$, where $\varepsilon$ is porosity. IEMs with arbitrary cation transference number $t_{m,+}$ were modeled using diffusion potential and Donnan potential to determine the solution phase potential drop from side i to side j of a given membrane:

$$\phi_{e,i} - \phi_{e,j} = \frac{2R_gT}{F}(1-t_{m,+})\ln\left(\frac{f_{\pm,i}c_{e,i}}{f_{\pm,j}c_{e,j}}\right) \quad (2)$$

Equation 2 can be obtained from an expression for electrostatic membrane potential[72] using the definition of solution-phase potential as the reduced electrochemical potential of Na ions in solution.[36,70] The membrane transference number $t_{m,+}$ is enforced by constraining the fraction of cationic current in solution to $\vec{i}_{e,+} = t_{m,+}\vec{i}_e$, where the cationic current density is $\vec{i}_{e,+} = -t_+\kappa_{\mathit{eff}}\nabla \phi_e$ and $\vec{i}_e$ is the solution-phase current density appearing as the argument of the divergence operator in Eq. 1. In addition, the salt conservation equation is modified to include the experimentally measured[73] bulk chemical diffusion coefficient of salt $\tilde{D}$:

$$\frac{\partial(\varepsilon c_e)}{\partial t} + \nabla \cdot (\vec{v}_s c_e) + \nabla \cdot \left(-\tilde{D}_{\mathit{eff}} \nabla c_e\right) - av_s(1-t_+)\frac{i_n}{F} = 0 \quad (3)$$

where the effective chemical diffusion coefficient of salt is given by Bruggeman theory as $\tilde{D}_{\mathit{eff}} = \varepsilon^{1.5}\tilde{D}$. Bulk ion conductivity $\kappa$ is calculated using the following equality for concentrated binary electrolytes with complete salt dissociation:[70]

$$\kappa = c_e F^2 \tilde{D}/(2R_gT\gamma_\pm t_+(1-t_+)).$$

The (de)intercalation of Na-ions within NiHCF is modeled according to the following reaction:[54]

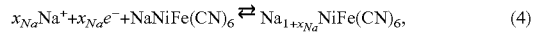
$$x_{Na}Na^+ + x_{Na}e^- + NaNiFe(CN)_6 \rightleftharpoons Na_{1+x_{Na}}NiFe(CN)_6, \quad (4)$$

where the stoichiometric factor $x_{Na}$ is the fraction of intercalated Na. The positive electrode is initialized in the Na-rich state with $x_{Na}$=99.9762% and the negative electrode in a sodium-deficient state with $x_{Na}$=0.0238%. Since NiHCF has been synthesized in either Na-rich[54] or Na-deficient[49] forms, reduction or oxidation of either compound would be required to prepare the two electrodes with this initial stoichiometry. The equilibrium potential of intercalation $\phi_{eq}$ is approximated by that of a regular solution of adatoms and vacancies with negligible pair interaction energy:[74]

$$\phi_{eq} = \phi_{eq}^0 + \frac{R_g T}{F} \ln\left(\frac{1 - x_{Na}}{x_{Na}}\right) \quad (5)$$

where the reference potential $\phi_{eq}^0$ is approximated as 0.60 V vs. SHE by the 50% state-of-charge potential measured from galvanostatic charge/discharge at low C-rate.[49] The kinetic polarization and mass transfer resistance within NiHCF particles is neglected because of their small size and high rate capability.[49,54] In practice, Butler-Volmer kinetics as described previously are employed with a finite rate constant of $2 \times 10^{-11}$ mol/m$^2$-s per (mol/m$^3$)$^{1.5}$ (similar to that of NMO) and with the volumetric surface area of 50 nm particles. For these conditions, the order of magnitude changes in rate constant affect polarization by less than 5 mV at 1 C. The terminal concentration of intercalated Na inferred from ideal stoichiometry (Eq. 4) and X-ray diffraction over-estimates the charge capacity of NiHCF by approximately 50% due to the presence of interstitial water.[49,54] Consequently, the terminal concentration of intercalated Na is scaled from the ideal value of 6,260 mol/m$^3$ to 4,100 mol/m$^3$, so as to match observed capacities at low cycling rate (approximately 60 mAh/g[49,54]). The porous electrodes simulated here include 50 vol. % NiHCF and 40 vol. % porosity.

Several cells using Na-ion intercalation compounds are simulated to evaluate scale-up of NID to electrodialysis stacks. In each case common dimensions are used for cell designs (1.0 mm electrode thickness, 0.4 mm membrane spacing, and 20 mm channel length). Each cell is charged and discharged at 54 A/m$^2$ average current density with a volumetric flow rate of 32 mL/hr per unit meter of cell depth. For the electrodes simulated here containing 50 vol. % NiHCF and 40 vol. % porosity, this current density corresponds to a theoretical charge/discharge time of 1 hr (i.e., a C-rate of 1 C). For the present current density and flow conditions 505 mM salt removal is expected by application of Faraday's Law,† which is 72.1% salt removal for the 700 mM influent simulated here. In practice charge/discharge processes are terminated if cell voltage reached a certain value, as described previously. Charge/discharge is terminated if the cell-voltage reached either −0.488 V, −0.577 V, −0.754 V, −0.931 V, or −1.107 V for stacks having 2, 4, 8, 12, or 16 flow channels, respectively, to accommodate the high polarization in large ED stacks. In addition, charge/discharge processes are also terminated if the local reduction potential within either electrode reaches 0.80 V vs. SHE, so as to prevent O$_2$ evolution.

Figure 18:
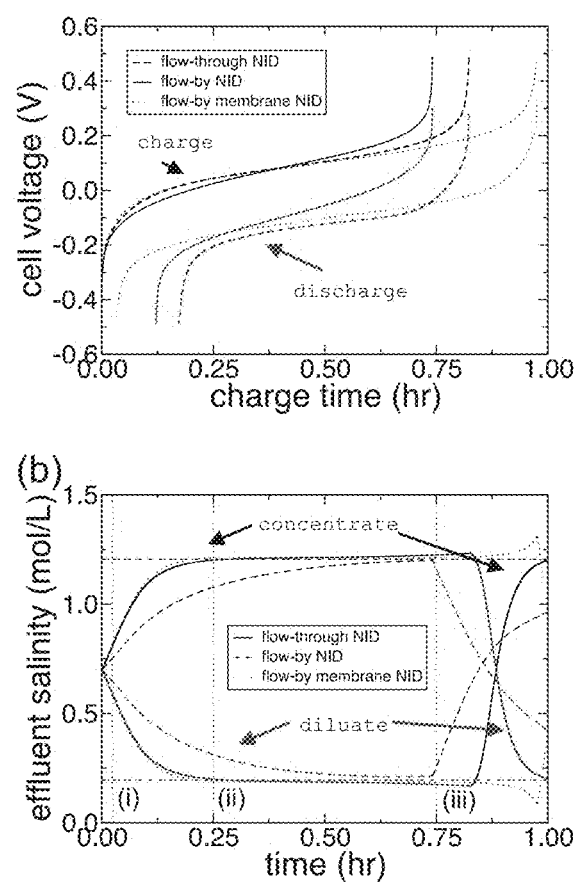
FIG. 18a: Cell voltage as a function of time is shown for both charge (black curves) and discharge steps (red curves) of the first cycle for flow-through, flow-by, and flow-by membrane NID.
FIG. 18b: Effluent salinity as a function of time is shown for both concentrate (black curves) and diluate (red curves) during the first cycle. Theoretical effluent concentrations are shown as blue dashed horizontal lines.

The flow-through design described previously poses challenges to the mechanical design of NID cells, because of the low fluidic permeability of cast electrodes with small pores. Alternatively, a flow-by configuration can be employed where saline water flows in open channels instead of through porous electrodes. Furthermore, membranes are commonly employed in flow-by CDI, called membrane CDI or MCDI, to reduce energy consumption.[75] Accordingly, the performance of flow-by NID cells using CEMs adjacent to electrodes in a so-called flow-by model was used. The effect of these flow/membrane configurations on cell voltage, effluent salinity, and the spatial of salt distribution within these cells was evaluated. FIG. 18a shows the variation of cell voltage as a function of charge time (i.e., negative time corresponds to discharge) for the first charge/discharge cycle of these three NID cells. Flow-by membrane NID shows improved capacity and similar polarization to flow-through NID, despite the larger thru-plane thickness of the flow-by NID. In contrast, when flow-by NID is used (i.e., without CEMs) lesser capacity is obtained and more polarization is incurred than with CEMs (i.e., flow-by membrane NID). FIG. 18b shows effluent salinity for these cells as well. All three cells eventually produce effluent near theoretical levels, but flow-by NID requires nearly three-fold longer time to reach the desired effluent salinity than flow-through NID and flow-by membrane NID.

Figure 19:
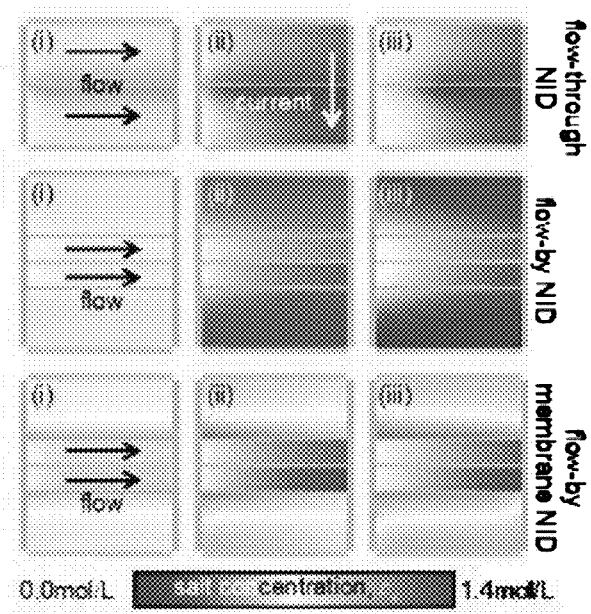
FIGS. 19-20: Snapshots of salt concentration and intercalated-Na fraction for three instants in time.
Figure 20:
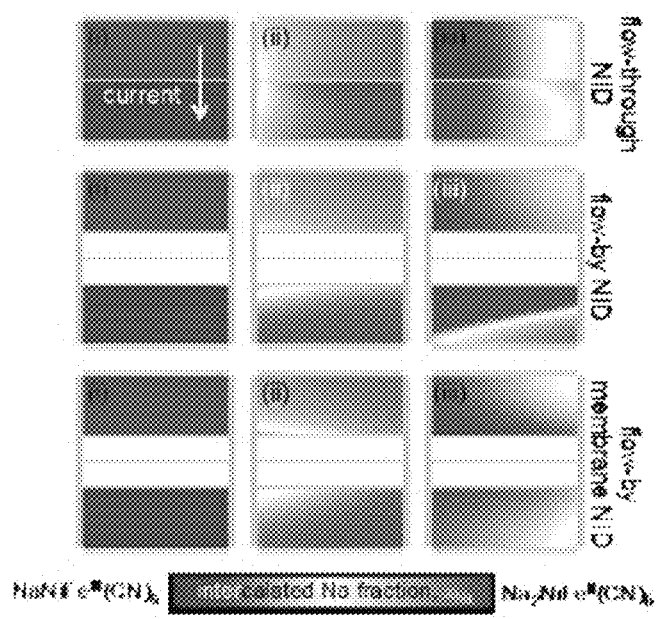

The aforementioned results reveal that flow-by membrane NID is preferable to flow-by NID. The superior performance of flow-by membrane NID is a result of its ability to retain salt within Na-ion electrodes. This phenomenon is revealed in FIG. 19, which shows snapshots of salt concentration within each cell at several instants during charging. Though after 30 minutes of charging flow-by NID achieves theoretical desalination levels, salt concentration within the positive electrode decreases to the same degree due to salt transport at the electrode/flow-channel interface. In contrast, salt concentration within the electrodes of the flow-by membrane NID cell is non-uniform due to concentration polarization at the CEM, but on average it remains at the initial salinity level. FIG. 20 shows the spatial variation in composition of NiHCF particles within the electrodes, represented here as intercalated-Na fraction, at the same instants during charging. Flow-through and flow-by membrane NID cells show streamwise propagation of an intercalation reaction zone (as described previously) because of the membrane polarization at the electrode edge. In contrast, in flow-by NID intercalation reactions progress through the thickness of electrodes because conventional separators have negligible membrane polarization.

Flow-by membrane NID exhibits several benefits over the other two architectures including its flowability, high capacity, and low polarization. The structure of alternating membranes within the flow-by membrane NID cell (CEM/AEM/ . . . /CEM) is similar to that found in ED stacks, the main difference being that NID cells contain two flow passages while ED stacks can theoretically employ any multiple of two flow channels.

Figure 21:
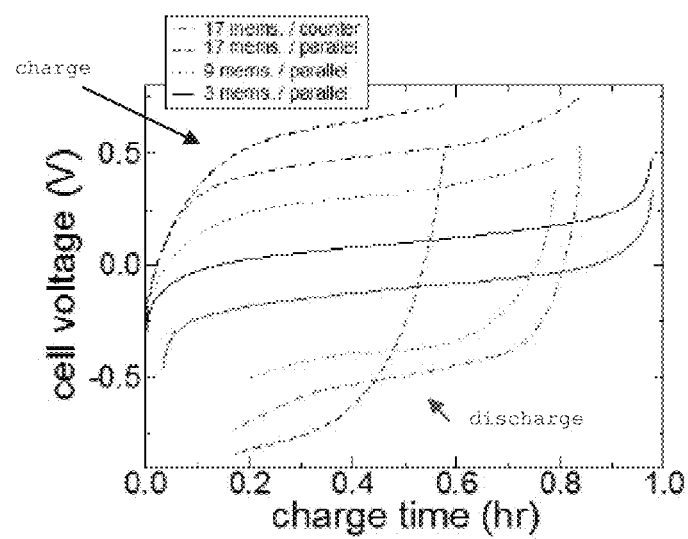
FIG. 21: Cell voltage as a function of time is shown for both charge (top four black curves) and discharge steps (bottom four red curves) of the first cycle for NID electrodialysis stacks with 9 membranes and parallel flow, 17 membranes and parallel flow, and 17 membranes and counterflow.
Figure 22:
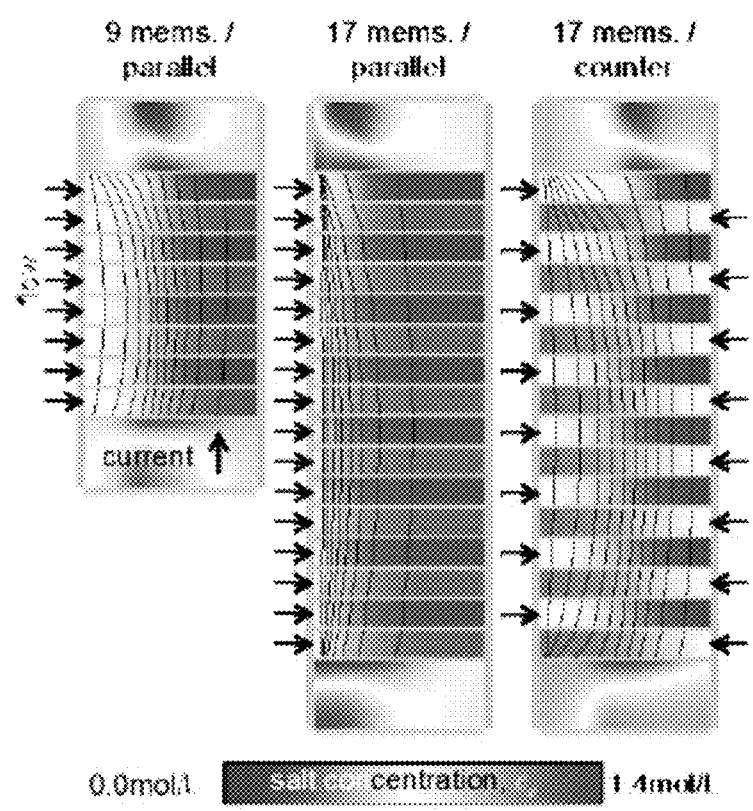
FIG. 22: Snapshots of salt concentration.
Figure 23:
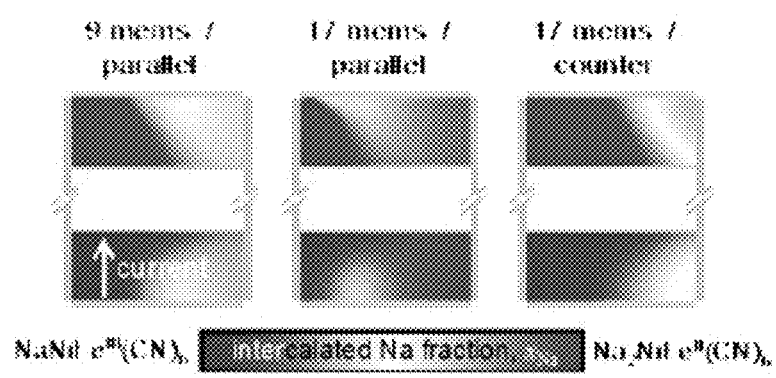
FIG. 23: Intercalated-Na fraction at the end of discharge are shown for each cell. Solution-phase current-density lines (black lines) are overlaid on the salt concentration fields within the flow channels.

Accordingly, the effect of adding flow channels to an NID cell, introducing a novel ED stack that uses Na-ion intercalation electrodes. Shown in FIGS. 21-23 are the cycling characteristics of NID electrodialysis stacks with 9 and 17 membranes comprising 8 and 16 flow channels, respectively. In addition, two different flow scenarios were tested: (1) parallel flow where influent in adjacent channels flows in the same direction and (2) counterflow where influent flows in opposing directions. Alternative flow modes and stack configurations have been considered in electrodialysis previously.[76] Upon examination of the voltage curves for these stacks, average polarization increases as the number of membranes increases (or, equivalently, flow channels). This effect is due to the additive nature of the Donnan potentials that act at solution/membrane interfaces.

Under these conditions the 17-membrane cell in counterflow achieves 67% utilization, in spite of its increased polarization relative to the 3-membrane cell. In contrast, the 17-membrane cell in parallel flow attains only 40% utilization. To understand the origin of the observed capacity variations, the solution-phase current and salt concentration distribution within each stack is examined. FIG. 22 shows salt concentration at the end of discharge and the lines along which ionic current flows within the electrolyte in the flow channels. FIG. 23 shows the distribution of intercalated Na within NiHCF particles in the electrodes at the same instants in time. Current-density lines (similar to heat-flux lines or "adiabats" in conduction heat transfer) can be understood alternatively as surfaces through which no current flows. Further, the position of these current-density lines has been chosen here such that 10% of the total current flows within the solution between adjacent lines. Few previous models[77] in electrodialysis have examined current distribution within stacks. For the 9-membrane, parallel-flow cell these lines are uniformly spaced, revealing that ionic current flows uniformly and flows along the shortest path from the positive to the negative electrode. When the number of flow channels is doubled to 16 by using 17 membranes, the current distribution in parallel flow becomes focused at the inlet of the flow channels where current-density lines are grouped closely. The high current density at the inlet is responsible for the higher polarization and lower capacity produced by this stack. This behavior is due to the non-uniform membrane polarization that occurs in parallel flow. In contrast, when a counterflow arrangement is used uniform current distribution is produced even with 17 membranes. Here, uniform current density is enabled by counterflow's greater uniformity of membrane polarization. Despite the variations in capacity and the non-uniformity of current density, each of these cells produce effluent near the theoretical salinity levels.

Figure 24:
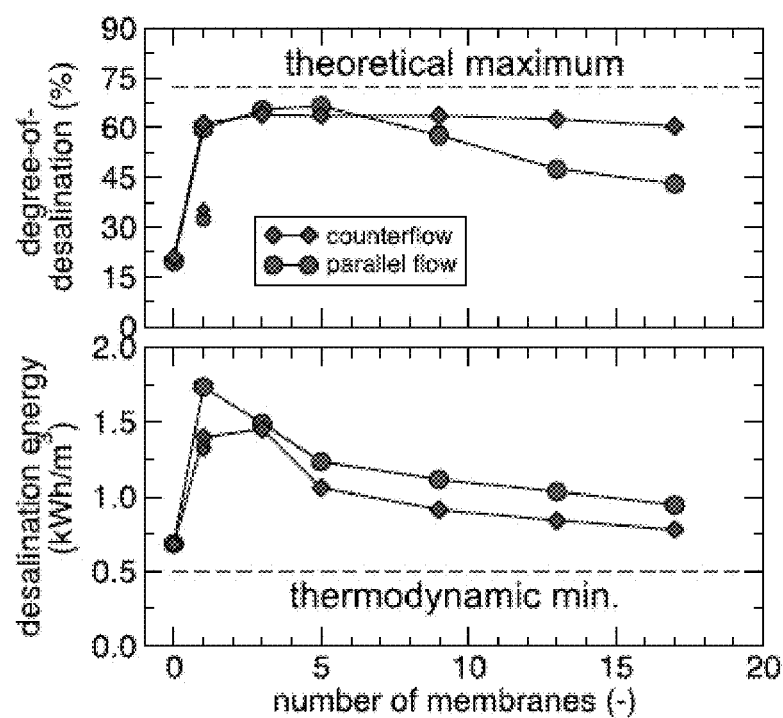
FIG. 24: Degree-of-desalination and desalination energy for the discharge step of the first cycle. For cells with one membrane, data for flow-by NID (without CEMs) is shown separately with small symbols, while flow-through NID is plotted as part of the discrete series of NID ED stacks with large symbols.

Desalination metrics for NID ED stacks constructed with various numbers of membranes were calculated. FIG. 24 shows the degree-of-desalination (salt removal normalized to influent salinity of 700 mM) with a range of cells: separator-based NID with no IEMs, flow-through NID with one AEM, flow-by NID with one AEM and no CEMs, flow-by membrane NID with one AEM and two CEMs, and a range of NID ED stacks. The results for both counterflow and parallel flow configurations are shown for each cell. All counterflow cases except flow-by and separator cells show salt removal in excess of 60%. In contrast, parallel flow exhibits reduced degree-of-desalination for large stacks due to their non-uniform current distributions (see FIG. 25). FIG. 24 also shows the energy consumed per cubic meter of diluate produced (referred to as desalination energy) assuming no energy is recovered during charge/discharge processes. Excluding separator-based cells, desalination energy decreases with increasing stack size, and it approaches the thermodynamic minimum energy consumption‡ within 60%. This decreasing trend occurs because ohmic and kinetic losses within the electrodes are distributed over a larger volume of product effluent for large stacks.

Figure 25:
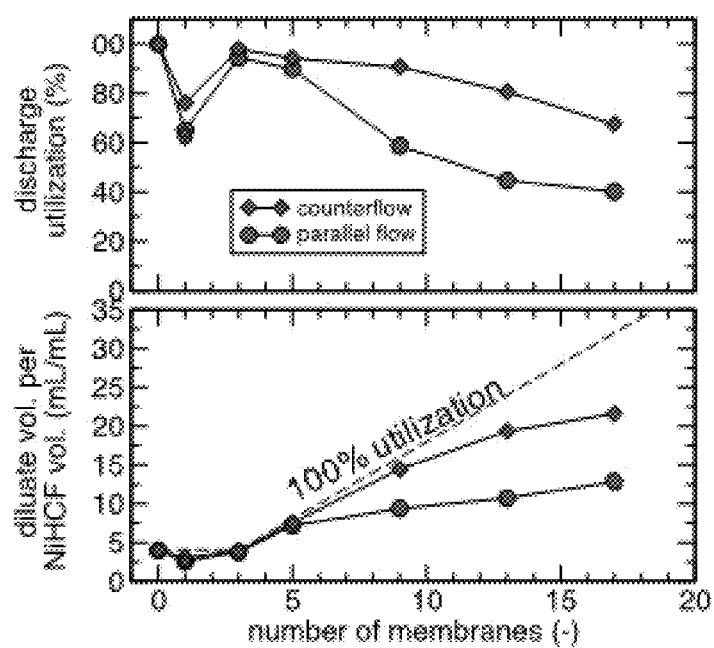
FIG. 25: Discharge utilization and diluate volume produced per unit volume of NiHCF in both electrodes as a function of number of membranes for the discharge step of the first cycle. For cells with one membrane, data for flow-by NID (without CEMs) is shown separately with small symbols, while flow-through NID is plotted as part of the discrete series of NID ED stacks with large symbols.
Figure 26:
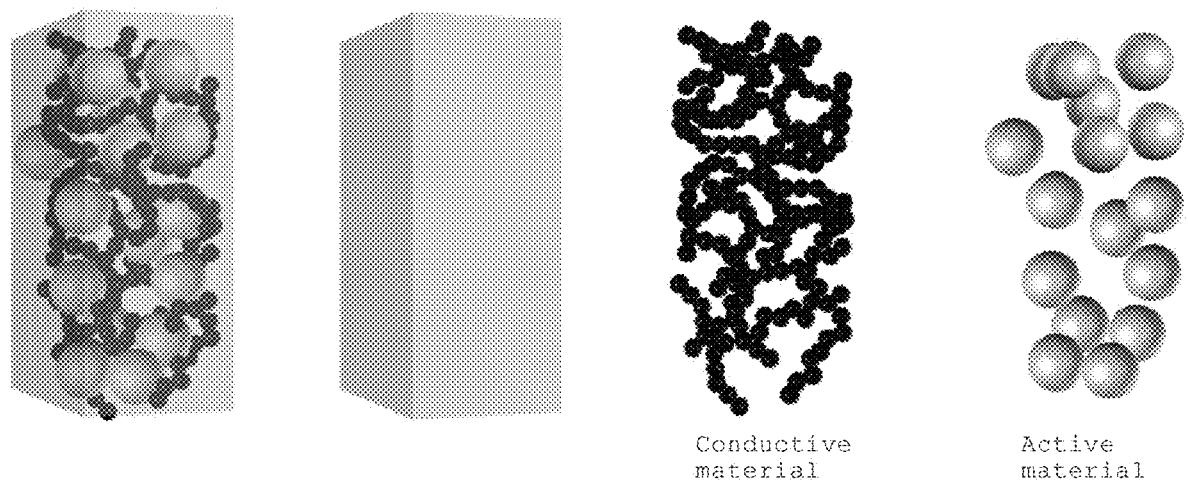
FIG. 26 illustrates an exploded view of a porous electrode that has a network of conductive material comprising an electrode active material dispersed throughout the conductive material.
Figure 27:
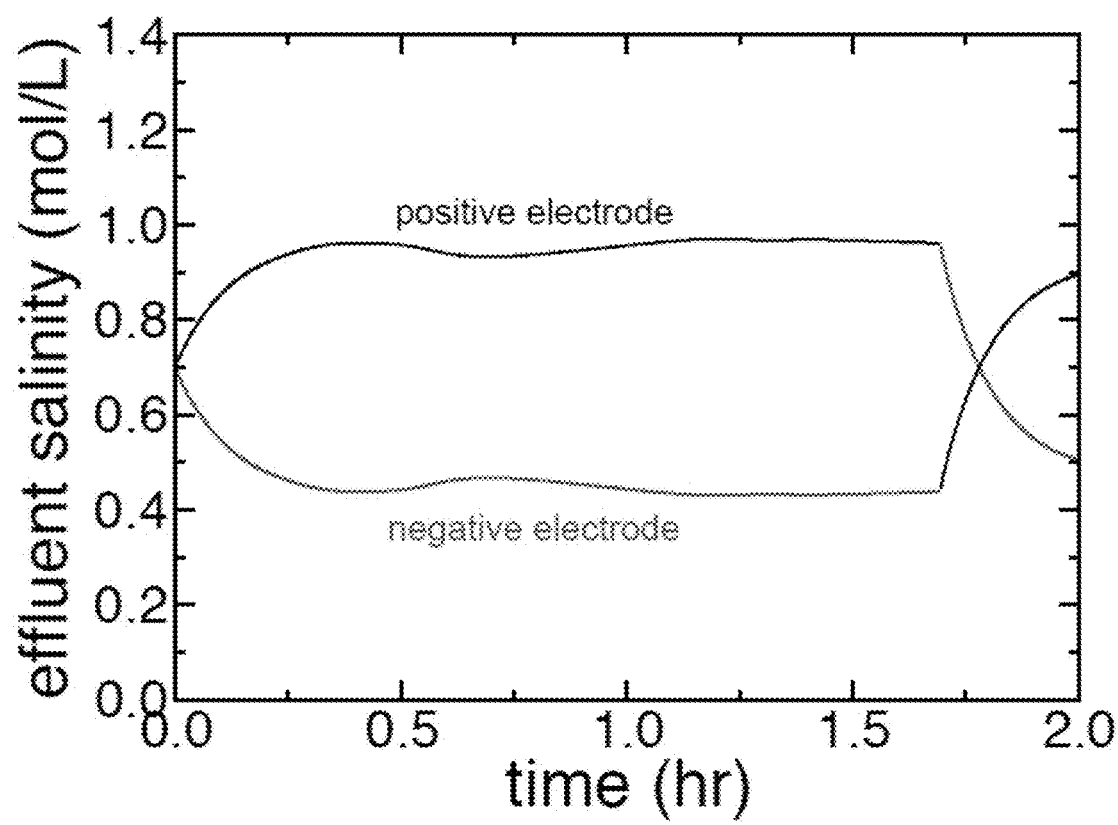
FIGS. 27-32 illustrate performance information associated with desalination including effluent salinity, cell voltage, intercalation rate and salt concentration.
Figure 28:
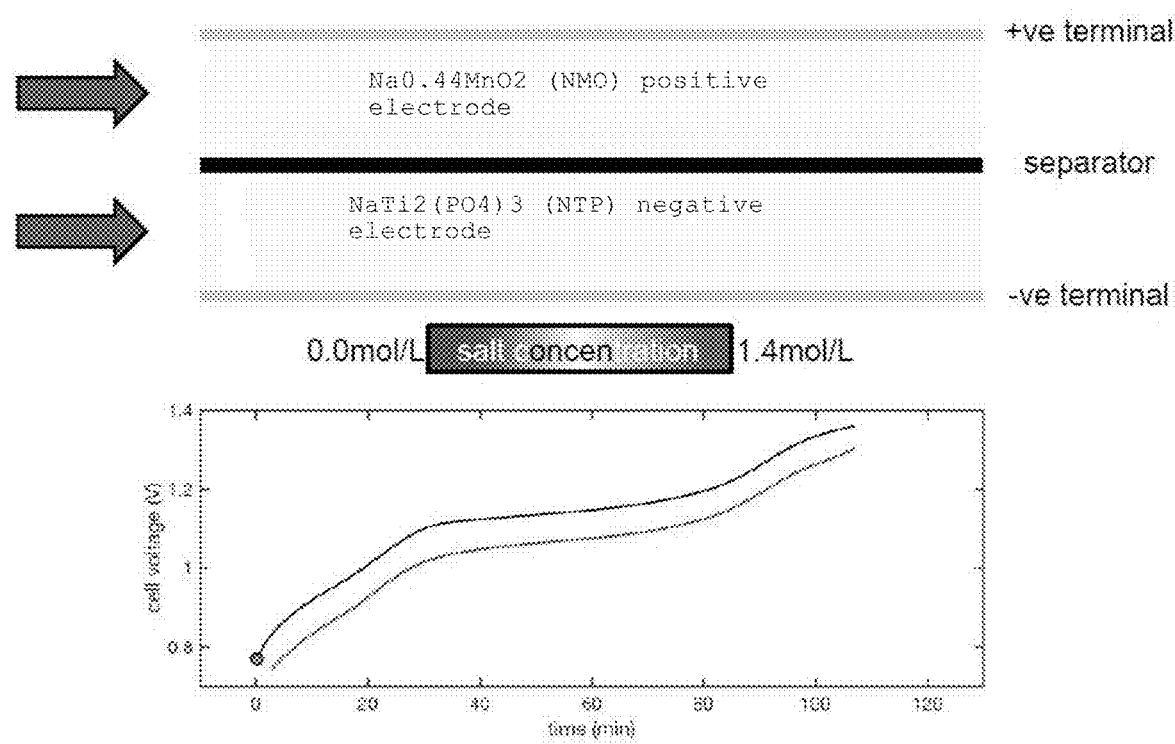
Figure 29:
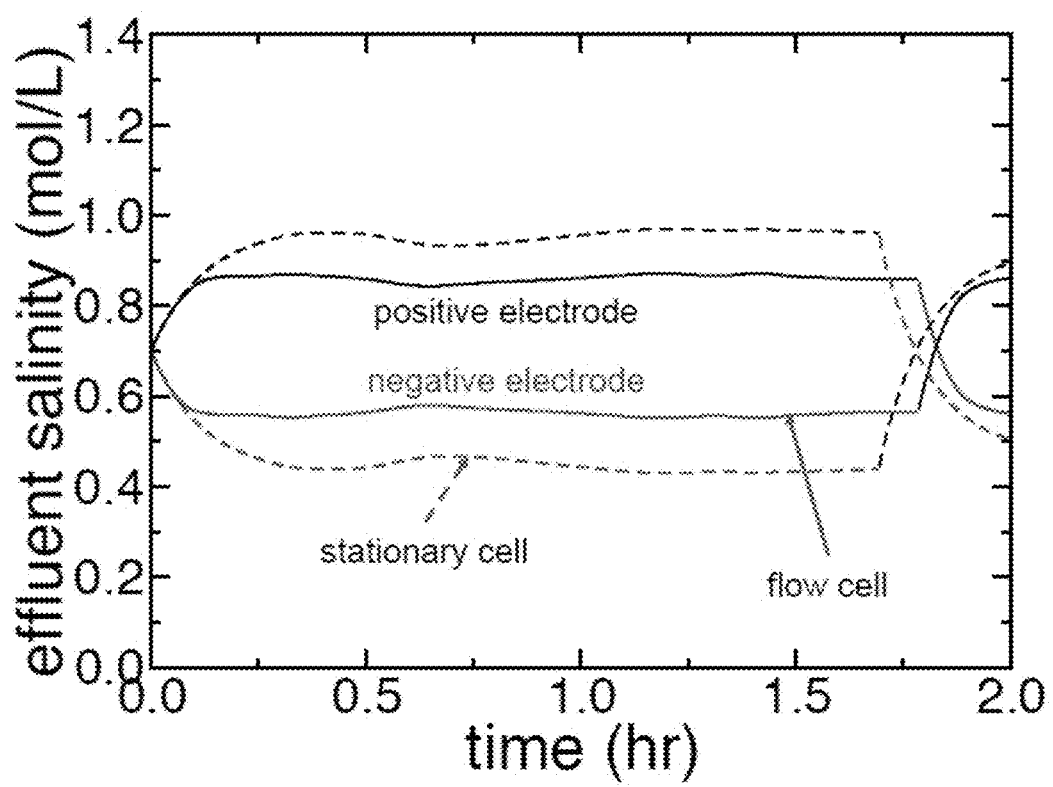
Figure 30:
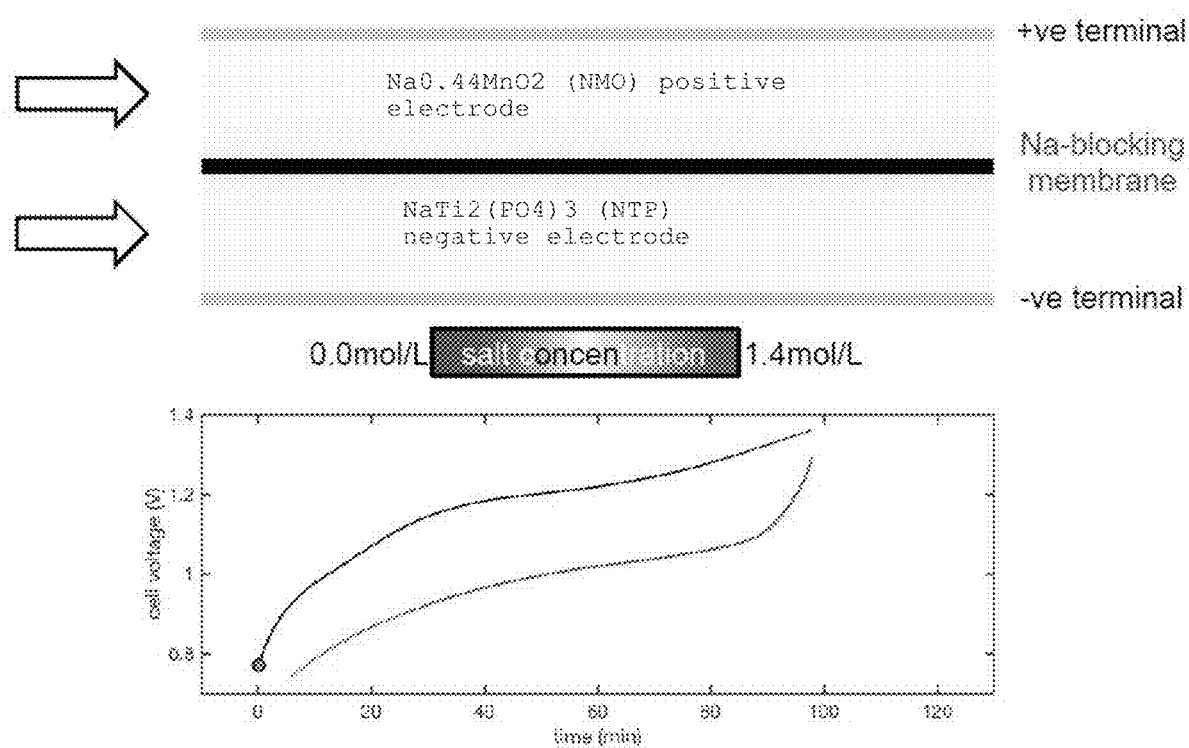
Figure 31:
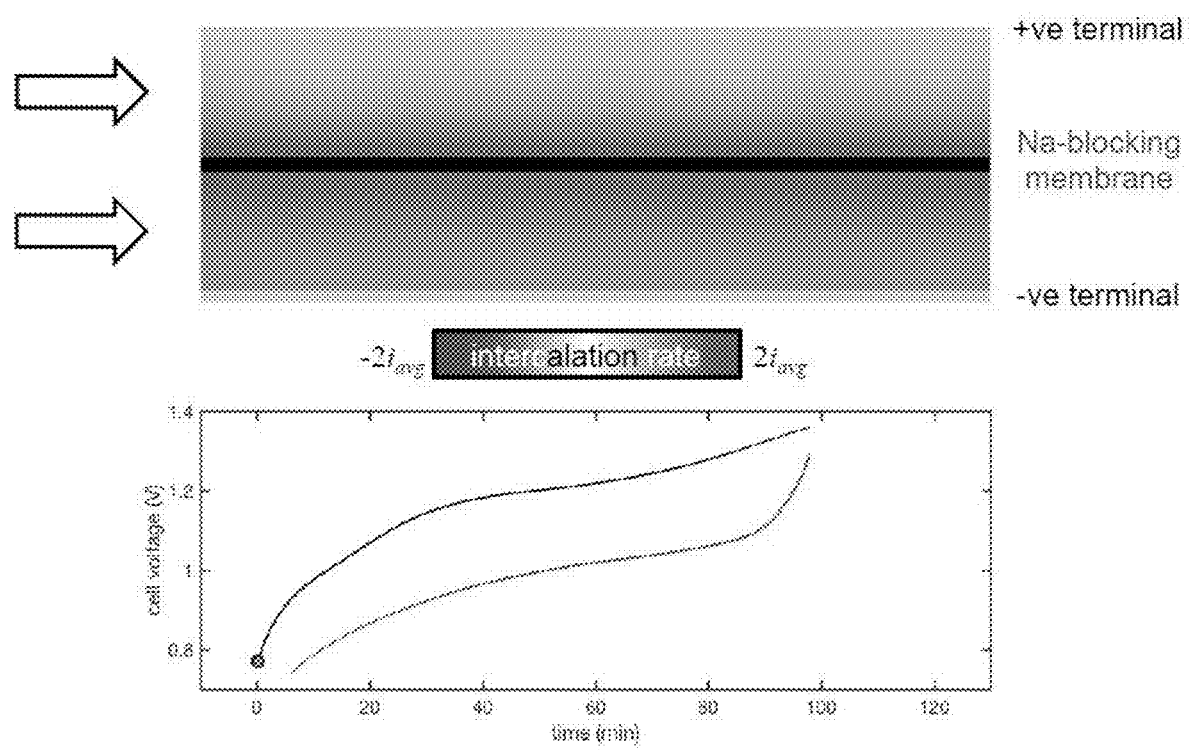
Figure 32:
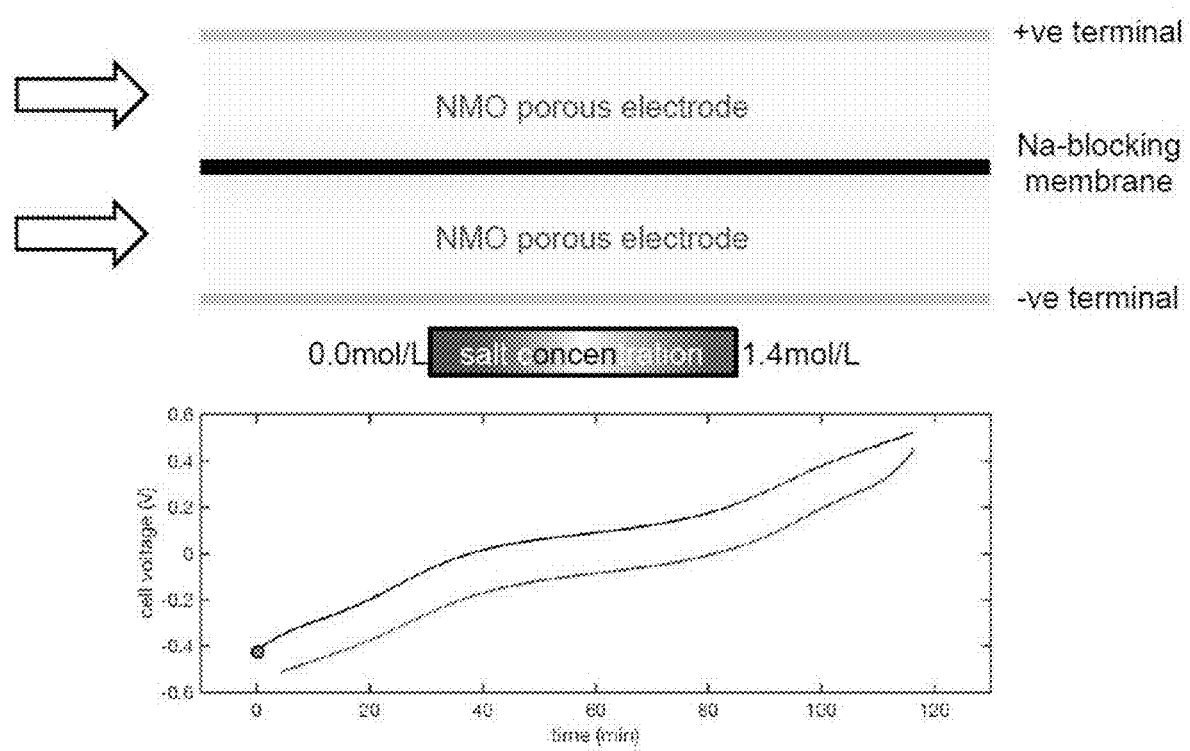

An advantage of incorporating Na-ion electrodes into an ED stack is the ability to generate large amounts of product diluate with small amounts of intercalation host material. If 100% utilization of intercalation capacity is assumed, the volume of diluate produced per unit volume of intercalation material increases with the size of ED stacks (FIG. 25). As shown in FIG. 25, simulated utilization is less than 100% due to the combined effects of membrane polarization and flow-channel resistance. When membrane flow-by NID is operated in counterflow its diluate volume of 3.9 mL/mL approaches the theoretical limit (4.0 mL/mL), while flow-through and flow-by NID produce only 3.0 mL/mL. Large stacks show the most pronounced effect of flow configuration on diluate production. 17-membrane cells produce 21.6 mL/mL in counterflow and 12.9 mL/mL in parallel flow, respectively. Even greater utilization, diluate volume, and stack scaling may be achieved by recirculation of electrolyte through flow channels and electrodes. FIG. 26 illustrates a porous electrode that has a network of conductive material comprising an electrode active material dispersed throughout the conductive material. FIGS. 27-32 illustrate performance information associated with desalination including effluent salinity, cell voltage, intercalation rate and salt concentration.

In one or more embodiments, the active material can be a single active material (for one or both of the porous electrodes) or can be a combination of active materials in various configurations including different active materials along a flow path of the porous electrode(s).

In one or more embodiments, a desalinated effluent, a concentrated effluent or both can flow back through the electrochemical cell to repeat the desalination process. In one or more embodiments, different flow rates can be utilized for the desalinated effluent and the concentrated effluent. In another embodiment, different flow rates can be utilized between adjacent channels of the electrochemical cell.

In one embodiment, a desalination device includes: an electrochemical cell comprising a porous positive electrode, a porous negative electrode, and a membrane positioned between the porous positive electrode and the porous negative electrode, where the electrodes comprise a network of conductive material comprising a plurality of electrode active materials dispersed throughout the conductive material, and where the porous negative electrode and the porous positive electrode have the same electrode active material The desalination device can include a power supply to supply a current to the electrochemical cell; an inlet for providing a feed stream to the electrochemical cell; a first outlet line for removing a concentrated effluent; and a second outlet line for removing a desalinated effluent.

In one or more embodiments, the electrode active material is a sodium ion intercalation host compound. In one or more embodiments, the sodium ion intercalation host compound is selected from $Na_{0.44}MnO_2$, lamda-$MnO_2$, gamma-$MnO_2$, delta-$MnO_2$, $Na_2FeP_2O_7$, $Na_3V_2(PO_4)_3$, $NaVPO_4F$, $NaCo_{1/3}Ni_{1/3}Mn_{1/3}PO_4$, olivine $Li_xMePO_4$, $NaTi2(PO_4)_3$, nickel-hexacyanoferrate Prussian Blue Analogues (PBAs), copper-nickel-manganese mixture hexacynanoferrate PBAs, nickel-copper-manganese mixture hexacyanomanganate PBAs, and vanadium oxides. In one or more embodiments, the feed stream is sea water or brackish water. In one or more embodiments, the concentrated effluent flows out of the porous positive electrode and the desalinated effluent flows out of the porous negative electrode.

In one or more embodiments, the membrane is selected from a polymeric separator and an anion-selective membrane. In one or more embodiments, the membrane is a sodium ion blocking membrane. In one or more embodiments, the porous positive electrode and the porous negative electrode both have a flow path length extended between about 1 mm to 20 mm and a thickness extending between 0.5 mm to 5 mm. In one or more embodiments, the porous positive electrode and the porous negative electrode both have a porosity of about 40 vol. % to 90 vol. %. In one or more embodiments, the porous positive electrode and the porous negative electrode have an intercalation host compound loading of 1 vol. % to 60 vol. %. In one or more embodiments, the electrochemical cell is rechargeable.

In one or more embodiments, a desalination device includes an electrochemical cell comprising a porous positive electrode; a porous negative electrode, and a plurality of channels positioned in between the electrodes and separated by a plurality of membranes with alternating selectivity toward cations and anions, where the electrodes comprise a network of conductive material comprising a plurality of electrode active materials dispersed throughout the electrode, the porous negative electrode and the porous positive electrode comprising the same electrode active materials. The desalination device can include a power supply to supply a current to the electrochemical cell; a plurality of inlet lines for providing feed streams to the channels; a first plurality of outlet lines; and a second plurality of outlet lines, wherein the first plurality of outlet lines and the second plurality of outlet lines have an alternating flow direction.

In one or more embodiments, the electrochemical cell comprises 4 electrolyte channels to about 1000 electrolyte channels. In one or more embodiments, the channels have a flow path length extending between 1 mm and 20 mm. In one or more embodiments, the channels have a channel thickness of about 0.2 mm to 5 mm. In one or more embodiments, the feed stream flows through the plurality of channels. In one or more embodiments, the feed stream flows through the plurality of channels and circulates through the porous positive electrode and the porous negative electrode. In one or more embodiments, the feed stream flows through adjacent electrolyte channels in opposite directions. In one or more embodiments, the feed stream flows through adjacent electrolyte channels in the same direction. In one or more embodiments, the feed stream flows into and through the electrolyte channels; a concentrated effluent flows out through the first plurality of outlet lines that have passed through the electrolyte channels having the cation selective membrane located on the positive electrode side of the channel and the anion selective membrane on the negative electrode side of the channel, and every other electrolyte channel thereafter; and a desalinated effluent flows out of the second plurality of outlet lines that have passed through electrolyte channel having the anion selective membrane located on the positive electrode side of the channel and the cathode selective membrane on the negative electrode side of the channel, and every other electrolyte channel thereafter.

Other features and techniques for embodiments are described in "Theoretical evaluation of electrochemical cell architectures using cation intercalation electrodes for desalination" by Smith in Electrochimica Acta 230 (2017), described in "Na-Ion Desalination (NID) Enabled by Na-Blocking Membranes and Symmetric Na-Intercalation: Porous-Electrode Modeling" by Smith et al. in Journal of the Electrochemical Society 163 (2016), and described in "Comment on: Na-Ion Desalination (NID) Enabled by Na-Blocking Membranes and Symmetric Na-Intercalation: Porous-Electrode Modeling" by Smith et al. in Journal of the Electrochemical Society 163 (2016), the disclosures of all of which are hereby incorporated by reference herein.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

REFERENCES

1. Q. Schiermeier, Nature, 505, 10-11 (2013).
2. M. M. Mekonnen and A. Y. Hoekstra, Sci. Adv., 2, e1500323 (2016).
3. M. A. Shannon et al., Nature, 452, 301-310 (2008).
4. N. Ghaffour, T. M. Missimer, and G. L. Amy, Desalination, 309, 197-207 (2013).
5. M. Elimelech and W. A. Phillip, Science, 333, 712-717 (2011).
6. F. A. AlMarzooqi, A. A. Al Ghaferi, I. Saadat, and N. Hilal, Desalination, 342, 3-15 (2014).
7. J. W. Blair and G. W. Murphy, in SALINE WATER CONVERSION, Advances in Chemistry., vol. 27, p. 206-223, American Chemical Society (1960) http://dx.doi.org/10.1021/ba-1960-0027.ch020.
8. S. Porada, R. Zhao, A. van der Wal, V. Presser, and P. M. Biesheuvel, Prog. Mater. Sci., 58, 1388-1442 (2013).
9. P. M. Biesheuvel and A. van der Wal, J. Membr. Sci., 346, 256-262 (2010).
10. H. Li and L. Zou, Desalination, 275, 62-66 (2011).
11. M. E. Suss et al., Energy Environ. Sci., 5, 9511-9519 (2012).
12. J. Lee, S. Kim, C. Kim, and J. Yoon, Energy Env. Sci, 7, 3683-3689 (2014).
13. S. Jeon et al., Energy Environ. Sci., 6, 1471-1475 (2013).
14. S. Kim, J. Lee, C. Kim, and J. Yoon, Electrochimica Acta, 203, 265-271 (2016).
15. M. Pasta, C. D. Wessells, Y. Cui, and F. La Mantia, Nano Lett., 12, 839-843 (2012).
16. H. Strathmann, Desalination, 264, 268-288 (2010).
17. W. E. Katz, Desalination, 28, 31-40 (1979).

18. K. Dermentzis, Electrochimica Acta, 53, 2953-2962 (2008).
19. K. Dermentzis and K. Ouzounis, Electrochimica Acta, 53, 7123-7130 (2008).
20. M. Sadrzadeh and T. Mohammadi, Desalination, 221, 440-447 (2008).
21. J. R. Werber, C. O. Osuji, and M. Elimelech, Nat. Rev. Mater., 1, 16018 (2016).
22. T. Xu and C. Huang, AIChE J., 54, 3147-3159 (2008).
23. H. Strathmann, in Membrane Handbook, W. S. W. Ho and K. K. Sirkar, Editors, p. 223-229, Springer US (1992) http://link.springer.com.proxy2.library.illinois.edu/chapter/10.1007/978-1-4615-3548-5_17.
24. L. Alvarado and A. Chen, Electrochimica Acta, 132, 583-597 (2014).
25. J.-X. Qu and S.-M. Liu, Desalination, 46, 233-242 (1983).
26. O. Scialdone, C. Guarisco, S. Grispo, A. D. Angelo, and A. Galia, J. Electroanal. Chem., 681, 66-75 (2012).
27. O. Scialdone, A. Albanese, A. D'Angelo, A. Galia, and C. Guarisco, J. Electroanal. Chem., 704, 1-9 (2013).
28. J. Veerman, M. Saakes, S. J. Metz, and G. J. Harmsen, J. Appl. Electrochem., 40, 1461-1474 (2010).
29. A. Z. Weber et al., J. Appl. Electrochem., 41, 1137 (2011).
30. H. Jeon, H. Lee, K. H. Kang, and G. Lim, Sci. Rep., 3 (2013) http://www.nature.com/srep/2013/131219/srep03483/full/srep03483.html.
31. K. N. Knust, D. Hlushkou, R. K. Anand, U. Tallarek, and R. M. Crooks, Angew. Chem. Int. Ed., 52, 8107-8110 (2013).
32. T. F. Fuller, M. Doyle, and J. Newman, J. Electrochem. Soc., 141, 1-10 (1994).
33. C. Delmas, F. Cherkaoui, A. Nadiri, and P. Hagenmuller, Mater. Res. Bull., 22, 631-639 (1987).
34. S. I. Park, I. Gocheva, S. Okada, and J. Yamaki, J. Electrochem. Soc., 158, A1067-A1070 (2011).
35. F. Sauvage, L. Laffont, J.-M. Tarascon, and E. Baudrin, Inorg. Chem., 46, 3289-3294 (2007).
36. J. F. Whitacre, A. Tevar, and S. Sharma, Electrochem. Commun., 12, 463-466 (2010).
37. X. Wu et al., ChemSusChem, 7, 407-411 (2014).
38. S. Hartung et al., ChemPhysChem, 15, 2121-2128 (2014).
39. V. L. Chevrier and G. Ceder, J. Electrochem. Soc., 158, A1011-A1014 (2011).
40. S. P. Ong et al., Energy Environ. Sci., 4, 3680 (2011).
41. V. Palomares, M. Casas-Cabanas, E. Castillo-Martinez, M. H. Han, and T. Rojo, Energy Environ. Sci., 6, 2312 (2013).
42. A. D. Tevar and J. F. Whitacre, J. Electrochem. Soc., 157, A870 (2010).
43. X. Zhou, R. K. Guduru, and P. Mohanty, J. Mater. Chem. A, 1, 2757 (2013).
44. W. Wu, A. Mohamed, and J. F. Whitacre, J. Electrochem. Soc., 160, A497-A504 (2013).
45. H. Güler and F. Kurtuluş, Mater. Chem. Phys., 99, 394-397 (2006).
46. Z. Li, D. B. Ravnsbaek, K. Xiang, and Y.-M. Chiang, Electrochem. Commun., 44, 12-15 (2014).
47. Y. Cao et al., Adv. Mater., 23, 3155-3160 (2011).
48. M. Xu et al., RSC Adv., 4, 38140 (2014).
49. C. D. Wessells, S. V. Peddada, R. A. Huggins, and Y. Cui, Nano Lett., 11, 5421-5425 (2011).
50. C. D. Wessells, R. A. Huggins, and Y. Cui, Nat. Commun., 2, 550 (2011).
51. J. Song et al., J. Am. Chem. Soc., 137, 2658-2664 (2015).
52. T. Kim, M. Rahimi, B. E. Logan, and C. A. Gorski, Environ. Sci. Technol., 50, 9791-9797 (2016).
53. W. J. A. S. Gomes, C. de Oliveira, and F. Huguenin, Langmuir, 31, 8710-8717 (2015).
54. X. Wu, Y. Cao, X. Ai, J. Qian, and H. Yang, Electrochem. Commun., 31, 145-148 (2013).
55. Z. Li, D. Young, K. Xiang, W. C. Carter, and Y.-M. Chiang, Adv. Energy Mater., 3, 290-294 (2013).
56. M. Doyle, J. Newman, A. S. Gozdz, C. N. Schmutz, and J.-M. Tarascon, J. Electrochem. Soc., 143, 1890-1903 (1996).
57. K. E. Thomas, J. Newman, and R. M. Darling, in Advances in Lithium-Ion Batteries,
58. J. Newman and K. E. Thomas-Alyea, Electrochemical Systems, p. 672, John Wiley & Sons, (2012).
59. M. Della Monica, G. Petrella, A. Sacco, and S. Bùfo, Electrochimica Acta, 24, 1013-1017 (1979).
60. T. K. Perkins and O. C. Johnston, Soc. Pet. Eng. J., 3, 70-84 (1963).
61. J. F. Chambers, J. M. Stokes, and R. H. Stokes, J. Phys. Chem., 60, 985-986 (1956).
62. R. White, C. Walton, H. Burney, and R. Beaver, J. Electrochem. Soc., 133, 485-492 (1986).
63. V. P. Nemani, S. J. Harris, and K. C. Smith, J. Electrochem. Soc., 162, A1415-A1423 (2015).
64. Yvan Notay, AGMG Software and Documentation, http://homepages.ulb.ac.be/~ynotay/AGMG (2015).
65. Yvan Notay, Electron. Trans. Numer. Anal., 37, 123-146 (2010).
66. Y. Notay, SIAM J. Sci. Comput., 34, A2288-A2316 (2012).
67. A. Napov and Y. Notay, SIAM J. Sci. Comput., 34, A1079-A1109 (2012).
68. P. Albertus and J. Newman, Dualfoil 5 Program and Documentation http://www.cchem.berkeley.edu/jsngrp/fortran.html (2015).
69. M. Doyle, T. F. Fuller, and J. Newman, J. Electrochem. Soc., 140, 1526-1533 (1993).
70. W. Lai and F. Ciucci, Electrochimica Acta, 56, 4369-4377 (2011).
71. W. J. Hamer and Y.-C. Wu, J. Phys. Chem. Ref. Data, 1, 1047-1100 (1972).
72. F. G. Helfferich, Ion Exchange, p. 642, Courier Corporation, (1962).
73. J. A. Rard and D. G. Miller, J. Solut. Chem., 8, 701-716 (1979).
74. M. Z. Bazant, Acc. Chem. Res., 46, 1144-1160 (2013).
75. R. Zhao, S. Porada, P. M. Biesheuvel, and A. van der Wal, Desalination, 330, 35-41 (2013).
76. E. Brauns et al., Sep. Purif. Technol., 98, 356-365 (2012).
77. R. Kodým, P. Páanek, D. Šnita, D. Tvrzník, and K. Bouzek, J. Appl. Electrochem., 42, 645-666 (2012).
78. D. J. Kim et al., J. Power Sources, 244, 758-763 (2013).
79. V. R. Subramanian, V. D. Diwakar, and D. Tapriyal, J. Electrochem. Soc., 152, A2002 (2005).
80. F. G. Helfferich, *Ion Exchange*. Courier Corporation; p. 375 (1962).
81. G. Liu et al., J. Electrochem. Soc., 154, A1129-A1134 (2007).
82. K. C. Smith, Y.-M. Chiang, and W. C. Carter, J. Electrochem. Soc., 161, A486-A496 (2014).
83. P. M. Biesheuvel, J. Colloid Interface Sci., 332, 258-264 (2009).
84. A. L. Lipson et al., Chem. Mater., 27, 8442-8447 (2015).

85. L. Zhang, L. Chen, X. Zhou, and Z. Liu, Sci. Rep., 5, 18263 (2015).
86. A. A. Karyakin, Electroanalysis, 13, 813-819 (2001).

The invention claimed is:

1. A method comprising:
    directing a feed stream through a porous positive electrode of an electrochemical cell and through a porous negative electrode of the electrochemical cell, wherein the porous positive electrode and the porous negative electrode each comprise a network of conductive material comprising an electrode active material dispersed throughout the conductive material, wherein the electrode active material of each network is in a form of an intercalation host compound, wherein the porous positive electrode and the porous negative electrode have an intercalation host compound loading of 1 vol. % to 60 vol. %, and wherein a membrane of the electrochemical cell is positioned between the porous positive electrode and the porous negative electrode such that the porous positive electrode is in first physical contact with the membrane and such that the porous negative electrode is in second physical contact with the membrane;
    applying a current to the electrochemical cell resulting in:
        first electrons being released from the electrode active material of the porous positive electrode,
        cations de-intercalating from the electrode active material of the porous positive electrode,
        second electrons entering the electrode active material of the porous negative electrode,
        cations intercalating into the electrode active material of the porous negative electrode, and
        a solution-phase charge-imbalance driving at least one of anions or cations across the membrane;
    removing a concentrated effluent from the electrochemical cell; and
    removing a desalinated effluent from the electrochemical cell.

2. The method of claim 1, wherein the solution-phase charge-imbalance drives anions across the membrane from the porous negative electrode to the porous positive electrode.

3. The method of claim 1, wherein the electrode active material of the porous positive electrode and the electrode active material of the porous negative electrode are a same material.

4. The method of claim 1, wherein the feed stream comprises a first influent component that flows through the porous positive electrode and a second influent component that flows through the porous negative electrode.

5. A desalination device comprising:
    an electrochemical cell comprising a porous positive electrode, a porous negative electrode, and a membrane positioned between the porous positive electrode and the porous negative electrode, wherein the membrane is positioned such that the porous positive electrode is in first physical contact with the membrane and such that the porous negative electrode is in second physical contact with the membrane, wherein the porous positive electrode and the porous negative electrode each comprise a network of conductive material comprising an electrode active material dispersed throughout the conductive material, wherein the electrode active material of each network is in a form of an intercalation host compound, wherein the porous positive electrode and the porous negative electrode have an intercalation host compound loading of 1 vol. % to 60 vol. %, and wherein the membrane allows anions to flow therethrough;
    a power supply to supply a current to the electrochemical cell;
    an inlet for providing a feed stream to the electrochemical cell, the feed stream being directed through the porous positive electrode and through the porous negative electrode;
    a first outlet line for removing a concentrated effluent; and
    a second outlet line for removing a desalinated effluent.

6. The desalination device of claim 5, wherein the power supply is configured to switch a direction of the current that is supplied to the electrochemical cell.

7. The desalination device of claim 5, wherein the porous negative electrode and the porous positive electrode have a same electrode active material.

8. The desalination device of claim 5, wherein the intercalation host compound comprises a sodium ion intercalation host compound.

9. The desalination device of claim 8, wherein the sodium ion intercalation host compound comprises nickel hexacyanoferrate.

10. The desalination device of claim 8, wherein the sodium ion intercalation host compound is selected from $Na_{0.44}MnO_2$, lamda-$MnO_2$, gamma-$MnO_2$, delta-$MnO_2$, $Na_2FeP_2O_7$, $Na_3V_2(PO_4)_3$, $NaVPO_4F$, $NaCo_{1/3}Ni_{1/3}Mn_{1/3}PO_4$, olivine $Li_xMePO_4$, $NaTi2(PO_4)_3$, nickel-hexacyanoferrate Prussian Blue Analogues (PBAs), copper-nickel-manganese mixture hexacynanoferrate PBAs, nickel-copper-manganese mixture hexacyanomanganate PBAs, and vanadium oxides.

11. The desalination device of claim 5, wherein the concentrated effluent flows out of the porous positive electrode and the desalinated effluent flows out of the porous negative electrode.

12. The desalination device of claim 5, wherein the membrane is selected from a polymeric separator and an anion-selective membrane.

13. The desalination device of claim 5, wherein the membrane is a sodium ion blocking membrane.

14. The desalination device of claim 5, wherein the porous positive electrode and the porous negative electrode both have a flow path length extending between 1 mm to 20 mm and a thickness extending between 0.5 mm to 5 mm.

15. The desalination device of claim 5, wherein the porous positive electrode and the porous negative electrode both have a porosity of 40 vol. % to less than 50 vol. %, and wherein the intercalation host compound loading is approximately 50 vol. %.

16. An electrochemical cell comprising:
    a porous positive electrode, wherein the porous positive electrode comprises a first network of first conductive material having a first electrode active material dispersed throughout the first conductive material, wherein the first electrode active material is in a first form of a first intercalation host compound, wherein the porous positive electrode has a first intercalation host compound loading of 1 vol. % to 60 vol. %, and wherein applying a current to the electrochemical cell results in:
        first electrons being released from the first electrode active material of the porous positive electrode; and
        cations de-intercalating from the first electrode active material of the porous positive electrode;
    a porous negative electrode, wherein the porous negative electrode comprises a second network of second conductive material having a second electrode active material dispersed throughout the second conductive material, wherein the second electrode active material is in a second form of a second intercalation host compound, wherein the porous negative electrode has a second intercalation host compound loading of 1 vol. % to 60 vol. %, and wherein the applying the current to the electrochemical cell results in:
    second electrons entering the second electrode active material of the porous negative electrode; and
    cations intercalating into the second electrode active material of the porous negative electrode;
a membrane positioned between the porous positive electrode and the porous negative electrode, wherein the membrane is positioned such that the porous positive electrode is in first physical contact with the membrane and such that the porous negative electrode is in second physical contact with the membrane, and wherein the applying the current to the electrochemical cell results in:
    a solution-phase charge-imbalance driving at least one of anions or cations across the membrane;

an inlet for providing a feed stream to the electrochemical cell, the feed stream being directed through the porous positive electrode and through the porous negative electrode;
a first outlet line for removing a concentrated effluent; and
a second outlet line for removing a desalinated effluent.

17. The electrochemical cell of claim 16, wherein the solution-phase charge-imbalance drives anions across the membrane from the porous negative electrode to the porous positive electrode.

18. The electrochemical cell of claim 16, wherein the first and second electrode active materials are a same material.

19. The electrochemical cell of claim 16, wherein each of the first intercalation host compound and the second intercalation host compound comprises a respective sodium ion intercalation host compound.

20. The electrochemical cell of claim 16, wherein the membrane is selected from a polymeric separator and an anion-selective membrane.

\* \* \* \* \*